United States Patent [19]

Martin

[11] 3,906,454

[45] Sept. 16, 1975

[54] COMPUTER MONITORING SYSTEM

[75] Inventor: Robert Lanham Martin, Greensboro, N.C.

[73] Assignee: Bell Telephone Laboratories Incorporated, Murray Hill, N.J.

[22] Filed: May 18, 1973

[21] Appl. No.: 361,559

[52] U.S. Cl. .................... 340/172.5; 235/153 AC

[51] Int. Cl.² .................... G06F 11/00; G06F 11/06

[58] Field of Search .......... 340/172.5; 235/153 AC, 235/153 AK

[56] References Cited

UNITED STATES PATENTS

| | | | |
|---|---|---|---|
| 3,509,541 | 4/1970 | Gordon | 340/172.5 |
| 3,522,597 | 8/1970 | Murphy | 340/172.5 |
| 3,540,003 | 11/1970 | Murphy | 340/172.5 |
| 3,624,611 | 11/1971 | Wirsing | 340/172.5 |
| 3,626,383 | 12/1971 | Oswald | 340/172.5 |
| 3,688,263 | 8/1972 | Balogh, Jr. | 340/172.5 |
| 3,696,340 | 10/1972 | Matsushita | 340/172.5 |
| 3,763,474 | 10/1973 | Freeman | 340/172.5 |
| 3,771,131 | 11/1973 | Ling | 340/172.5 |
| 3,771,144 | 11/1973 | Belady | 340/172.5 |

OTHER PUBLICATIONS

"Program Monitoring Technique," *IBM, Technical Disclosure Bulletin*, H. W. Flanagan, Vol. 13, No. 8, January 1971, pp. 2399–2401.

*Primary Examiner*—Gareth D. Shaw
*Assistant Examiner*—James D. Thomas
*Attorney, Agent, or Firm*—R. O. Nimtz

[57] ABSTRACT

There is disclosed a computer monitoring system for detecting, filtering and storing "hardware events" and "software events". Hardware events are counted or timed, while software events resulting from special store instructions are selectively stored in a monitor memory. Software events can be used to initiate or terminate hardware measurements. Both hardware and software events may be stored exhaustively or only the most recent of a fixed number of events can be stored. Storage takes place on a plurality of tape units for later analysis.

7 Claims, 37 Drawing Figures

COMPUTER MONITOR

INPUT DATA WORD FORMAT

OUTPUT DATA WORD FORMAT

TIME OF DAY WORD FORMAT

STATUS WORD FORMAT

COUNTER WORD FORMAT

FIG. 3A
GATE
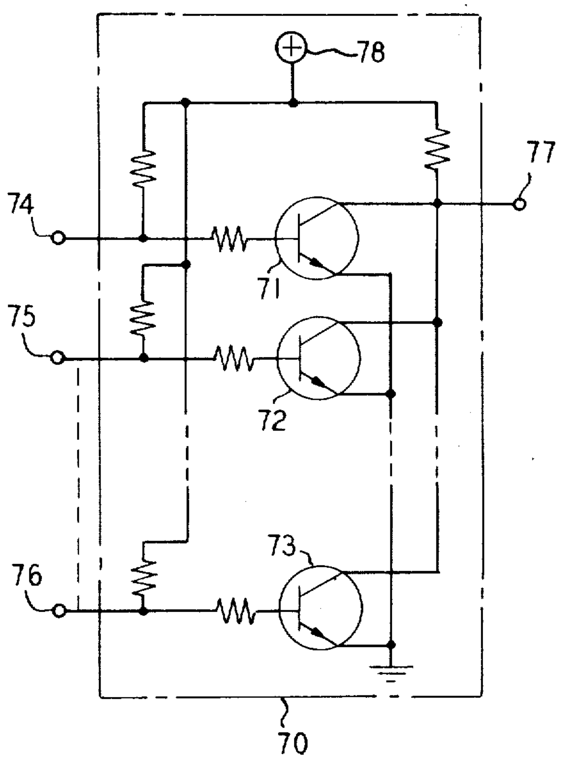
FIG. 3B
NAND
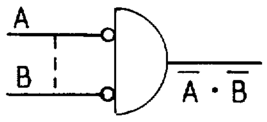
FIG. 3C
NOR
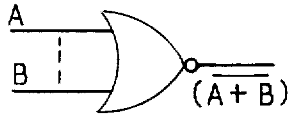
FIG. 3D
| A \ B | 0 | 1 |
|---|---|---|
| 0 | 1 | 0 |
| 1 | 0 | 0 |
FIG. 4A
FLIP-FLOP
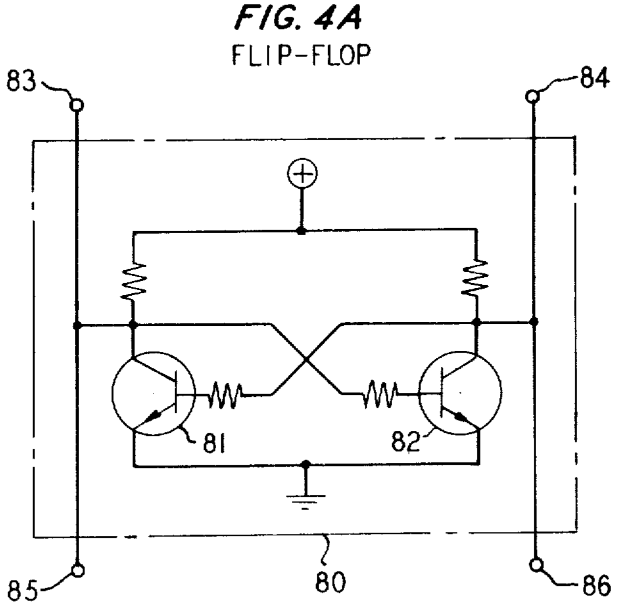
FIG. 4B
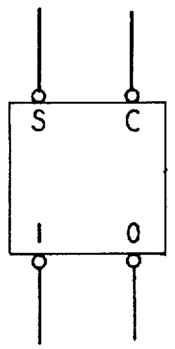

INVERTER

EMITTER FOLLOWER

CABLE DRIVER

PRIORITY AND LOST DATA CIRCUITS

PRIORITY TIMING

INPUT AND CONVERGENCE CIRCUITS

MATCHER LOGIC SECTION
(8 REQ'D)

FIG. 14 MASK-MATCH LOGIC CELL

FIG. 19 STORE CONTROL LOGIC

COUNTER SECTION

FIG. 22: CONTROL INPUT SWITCH MATRIX

| COUNTER | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| 0 | 0 | √ | | PU-15 | PU-14 | PU-13 | PU-12 | PU-11 | PU-10 | PU-9 | | | | PS-5 | VS-4 | MCU REQ TO ØCU IØC-1 | | CHAN 0 | CHAN 15 | CHAN 0 | CHAN 15 | |
| 1 | 0 | √ | PU-1 | | PU-15 | PU-14 | PU-13 | PU-12 | PU-11 | PU-10 | | | | PS-6 | VS-5 | MCU REQ TO ICU IØC-1 | | CHAN 1 | CHAN 0 | CHAN 1 | CHAN 0 | |
| 2 | 1 | √ | PU-2 | PU-1 | | PU-15 | PU-14 | PU-13 | PU-12 | PU-11 | | | | PS-7 | VS-6 | ØCU FR TO VS IØC-1 | | CHAN 2 | CHAN 1 | CHAN 2 | CHAN 1 | |
| 3 | 1 | √ | PU-3 | PU-2 | PU-1 | | PU-15 | PU-14 | PU-13 | PU-12 | | | | PS-8 | VS-7 | | ΣØCU FR-ACK TIME IØC-1 | CHAN 3 | CHAN 2 | CHAN 3 | CHAN 2 | |
| 4 | 2 | √ | PU-4 | PU-3 | PU-2 | PU-1 | | PU-15 | PU-14 | PU-13 | | | | PS-9 | VS-8 | ICU SR TO VS IØC-1 | | CHAN 4 | CHAN 3 | CHAN 4 | CHAN 3 | |
| 5 | 2 | √ | PU-5 | PU-4 | PU-3 | PU-2 | PU-1 | | PU-15 | PU-14 | | | | PS-10 | VS-9 | | ΣICU SR-ACK TIME IØC-1 | CHAN 5 | CHAN 4 | CHAN 5 | CHAN 4 | |
| 6 | 3 | √ | PU-6 | PU-5 | PU-4 | PU-3 | PU-2 | PU-1 | | PU-15 | | | | PS-11 | VS-10 | MCU START IØC-2 | | CHAN 6 | CHAN 5 | CHAN 6 | CHAN 5 | |
| 7 | 3 | √ | PU-7 | PU-6 | PU-5 | PU-4 | PU-3 | PU-2 | PU-1 | | | | | PS-12 | VS-11 | | ΣMCU START TO STOP IØC-2 | CHAN 7 | CHAN 6 | CHAN 7 | CHAN 6 | |
| 8 | 4 | √ | PU-8 | PU-7 | PU-6 | PU-5 | PU-4 | PU-3 | PU-2 | PU-1 | | | | PS-13 | VS-12 | MCU REQ TO ØCU IØC-2 | | CHAN 8 | CHAN 7 | CHAN 8 | CHAN 7 | |
| 9 | 4 | √ | PU-9 | PU-8 | PU-7 | PU-6 | PU-5 | PU-4 | PU-3 | PU-2 | | | | PS-14 | VS-13 | MCU REQ TO ICU IØC-2 | | CHAN 9 | CHAN 8 | CHAN 9 | CHAN 8 | |
| 10 | 5 | √ | PU-10 | PU-9 | PU-8 | PU-7 | PU-6 | PU-5 | PU-4 | PU-3 | | | | PS-15 | VS-14 | ØCU FR TO VS IØC-2 | | CHAN 10 | CHAN 9 | CHAN 10 | CHAN 9 | |
| 11 | 5 | √ | PU-11 | PU-10 | PU-9 | PU-8 | PU-7 | PU-6 | PU-5 | PU-4 | | | | PS-0 | VS-15 | | ΣØCU FR ACK TIME IØC-2 | CHAN 11 | CHAN 10 | CHAN 11 | CHAN 10 | |
| 12 | 6 | √ | PU-12 | PU-11 | PU-10 | PU-9 | PU-8 | PU-7 | PU-6 | PU-5 | | | | PS-1 | VS-0 | ICU SR TO VS IØC-2 | | CHAN 12 | CHAN 11 | CHAN 12 | CHAN 11 | |
| 13 | 6 | √ | PU-13 | PU-12 | PU-11 | PU-10 | PU-9 | PU-8 | PU-7 | PU-6 | | | | PS-2 | VS-1 | | ΣICU SR-ACK TIME IØC-2 | CHAN 13 | CHAN 12 | CHAN 13 | CHAN 12 | |
| 14 | 7 | √ | PU-14 | PU-13 | PU-12 | PU-11 | PU-10 | PU-9 | PU-8 | PU-7 | | | | PS-3 | VS-2 | MCU START IØC-1 | | CHAN 14 | CHAN 13 | CHAN 14 | CHAN 13 | |
| 15 | 7 | √ | PU-15 | PU-14 | PU-13 | PU-12 | PU-11 | PU-10 | PU-9 | PU-8 | | | | PS-4 | VS-3 | | ΣMCU START TO STOP IØC-1 | CHAN 15 | CHAN 14 | CHAN 15 | CHAN 14 | |

STORE INPUT CIRCUITS

STORE ADDRESS LOGIC

COMPUTER MONITORING SYSTEM

GOVERNMENT CONTRACT

The invention herein claimed was made in the courses of, or under contract with, the Department of the Army

FIELD OF THE INVENTION

This invention relates to data processing systems and, more particularly, to performance monitors for such systems.

BACKGROUND OF THE INVENTION

As digital computers have become larger and more complex, it has become increasingly important to monitor the performance of such systems to determine efficiency of operation as well as correctness of results.

Monitoring data processing systems can be divided into two categories, the first category being the monitoring of hardware events and the second being the monitoring of software events. In this connection, a hardward event is the occurrence of a discrete happening or change of state of one of the hardware elements of the data processing system. A software event, on the other hand, is the execution of a selected command or instruction in the programmed sequence of such commands and instructions.

While both hardware and software event monitoring is known in the prior art, such prior art systems have heretofore been plagued with the disadvantage of acquiring far more information concerning the operation of the data processing system than could be conveniently retained or analyzed. This disadvantage has made it necessary either to operate the data processing system in a simulation mode to slow down the sequence of monitored events or to interrupt the operation of the data processing system to permit data acquisition and analysis. In either case, the operation of the system to be monitored is sufficiently distorted as to render the accumulated monitored data suspect. Only data representing the normal operation of a data processing system can usually be relied on in evaluating and redesigning such systems.

SUMMARY OF THE INVENTION

In accordance with the present invention, a data processing system is monitored with respect to both hardware and software events without distorting the operation of the system being monitored.

As a software monitor, the present invention provides data gathering, data selection, and data reduction capabilities. The monitor of the present invention operates much like a storage unit to which monitored data entries are directed by program instructions inserted in the instruction stream. Each such monitored event includes identification information as well as parameter values. Hardware events are similarly detected, selected and reduced, to diminish the stored data stream to manageable size.

In order to sensibly reduce the volume of data being stored, and in accordance with the present invention, selected software events can be utilized to initiate and terminate the selection of both hardware and software events to be stored. This global reduction in data flow is accompanied by the capability of examining each event and storing only those events meeting preselected storage criteria.

Finally, the computer monitor of the present invention provides real-time data reduction by time-averaging or counting selected events rather than storing each one of such events. To this end, timing pulses are provided which can be counted during an event or between consecutive events.

The computer monitor of the present invention will be described in connection with the data processing system disclosed in J. S. Baynard, Jr., R. L. Coffin, J. E. Culom, N. Ehrlich, G. Jones, J. W. Olson, D. F. Widman U.S. Pat. No. 3,623,011, granted Nov. 23, 1971. This selection has been made only for the purposes of convenience; it will be clear that the techniques herein described are equally applicable to any other data processing system.

These and other objects and features, the nature of the present invention and its various advantages, will be more readily understood from a consideration of the attached drawings and from the following description of the drawings.

BRIEF DESCRIPTION OF THE DRAWINGS

In the drawings

FIGS. 3A, 3B, 3C and 3D are a detailed circuit diagram, a NAND symbol, a NOR symbol and a truth table, respectively, for a basic logic gate, useful in implementing the circuits of the remainder of the drawings;

FIGS. 4A and 4B are a circuit diagram and circuit symbol, respectively, of a flip-flop circuit, useful in realizing the circuits of the remainder of the drawings;

FIG. 22 is a matrix representation of the assignment of various hardware and software events to the various counters in the counter section of FIG. 20;

DETAILED DESCRIPTION OF THE DRAWINGS

Figure 1:
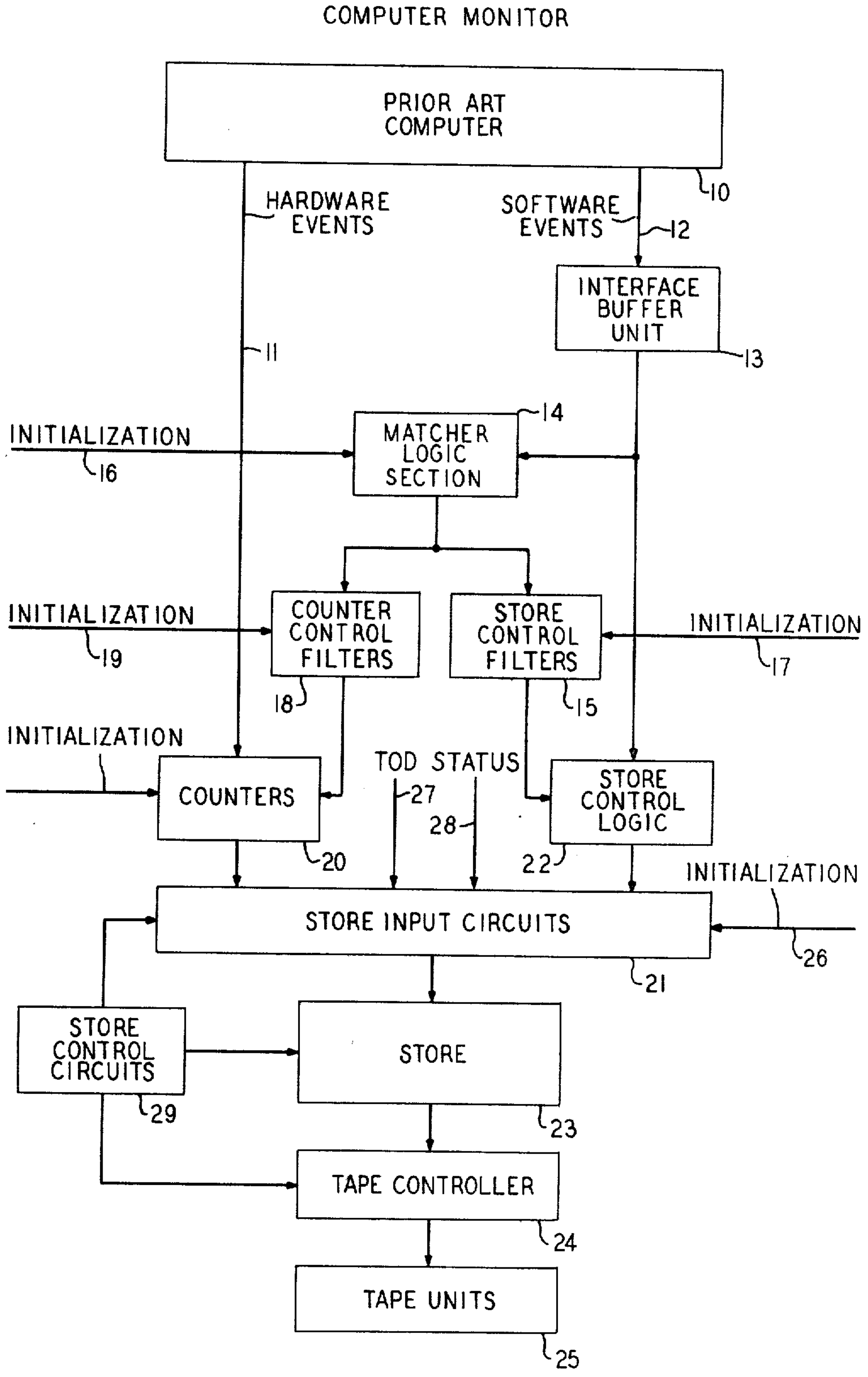
FIG. 1 is a general block diagram of the computer monitoring system in accordance with the present invention.

Before proceeding to a detailed description of FIG. 1, a general overview of the computer monitor of the present invention will be provided. In essence, the computer monitor is used for the purposes of debugging, tuning and evaluating an operating data processing system. The monitor is designed to provide these functions with minor, if any, perturbations on the normal operations of the data processing system.

The computer monitor of the present invention provides two types of monitoring which have been termed monitoring of hardware events and monitoring of software events. As a hardware monitor, the present invention provides the ability to directly measure many of the essential hardware activities of the various modules of the data processing system (e.g., processors, stores and input/output controllers).

As a software monitor, the present invention serves to receive and store data signals representing specific software events which have been introduced into the program code of the data processing system. Both software and hardware events are buffered by the monitor before transferring any actual information to magnetic tapes. The data processing system itself is relieved of the costly overhead of buffering and tape management.

In addition, once an event is stored in the monitor circuits, the monitor selects on an individual basis which should be retained and recorded and which events can be discarded. By means of initialization procedure, which may itself be under program control, the monitor is preset to begin recording only upon the occurrence of specific events and to stop recording upon the occurrence of other events. The initialization procedure can also be used to select which of the received events are to be stored during the period of enablement of the monitor. The monitor therefore has two methods for reducing data flow: a global method which prohibits all recording until a specific event occurs, and then individual selection based on the merit of each event itself which is received by the monitor.

Also included in the monitor of the present invention is the capability of reducing the data further by counting and time averaging. A group of counters can thus be used merely to count events, either software events or as simple accumulation of hardware events.

In FIG. 1 there is shown a general block diagram of the computer monitor of the present invention comprising a data processing system 10 which represenTs in general block form the computer to be monitored. Computer 10 may comprise any type of computer or programmed processor which it is desired to monitor. Computer 10 may comprise, for example, a general purpose digital computer or may comprise a special purpose machine to control such things as telephone switching. One computer system with which the present invention is useful is that shown in J. S. Baynard et al. U.S. Pat. No. 3,623,011, granted Nov. 23, 1971. A plurality of signal lines 11 are wired into computer 10 to provide indications of any desired hardware events occurring within the computer. While these events will vary from computer to computer, a representative selection will be described hereinafter for the purposes of illustration.

Computer 10 is also arranged to deliver on leads 12 a data word in response to a specific programmed command in the operating programs of the computer 10. In this regard, the data words on leads 12 are generated by the computer in the same fashion as other data words are generated for storage in the internal memory of the computer. The monitor of FIG. 1 can thus be treated as another storage module in the data processing system 10. The data words on leads 12 represent specific items of data (such as the contents of a particular register), together with some identification code to indicate exactly what that data represents.

The software events represented by data words on leads 12 are delivered to an interface buffer unit 13 which accepts such data words together with requests from the computer to store such words. Buffer unit 13 services these requests on a priority basis. Once a request is serviced, the data associated therewith is simultaneously delivered to the matcher logic section 14 and the store control logic 22.

The matcher logic section 14 compares each data word delivered to it with the initialization constants supplied to it on leads 16 and determines whether or not the received software event data word is acceptable for storage or for a control function. Matcher logic section 14 controls store control filters 15 to initiate, terminate and otherwise control storage of those data words which are to be permanently stored in the monitor. Initialization constants are supplied to store control filters 15 on leads 17 to further determine which particular software events are to be stored.

Matcher logic section 14 also controls counter control filters 18. Counter section 20 receives the hardware event signals on leads 11 from computer 10. Counter control filters 18 are used to control the use of these hardware events in section 20. It can thus be seen that direct control over the monitoring of hardware events can be provided by software events. Counter control filters 18 also receive initialization constants on leads 19 to determine which hardware events are to be accepted and for what purposes.

Counter section 20 contains a plurality of controllable counters which may be turned on, incremented, turned off and read, all under the control of signals generated by counter control filters 18. When it is told to do so by filter section 18, counter section 20 delivers an appropriate count word to store input circuit 21.

Store control filters 15 selectively control the delivery of software event data words to store input circuits 21.

In addition to the hardware counts and software events described above, the monitor of the present invention provides the capability of storing timing words on leads 27 to correlate the other stored data words with activities taking place in real time. Finally, the monitor of FIG. 1 also has the capability of storing status words on leads 28 relating to its own activites (e.g., parity errors) as an interpretation tool.

Information from the monitor of FIG. 1 can be stored in a store unit 23 in blocks which, when filled, are automatically dumped by tape control unit 24 onto tape units 25. Under the control of initialization signals on leads 26 to the store input circuit 21 and control signals from the store control circuit 29, store 23 may also be used in a circular fashion. In this mode, once a memory block has been filled, new data words override the first-received data words and thus only the most recently received data words are retained. Finally, store 23, under control of circuits 29, can be used in a combined mode in which a portion of the memory accumulates linear data blocks, each one of which is stored on tape, and circular data blocks in which only the most recently received data items are stored on tape. All of these functions will be described in greater detail in connection with the following detailed drawings.

In general, the computer monitor of FIG. 1 operates to assemble and select particular pieces of data reflecting the operation of computer 10 and storing this data on the tape units 25. This is accomplished by assembling data into storage words of 32 bit lengths. Some entries have 64 bit lengths and are stored in two words of 32 bits each. These data words will be described in connection with FIG. 2.

Figure 2A:
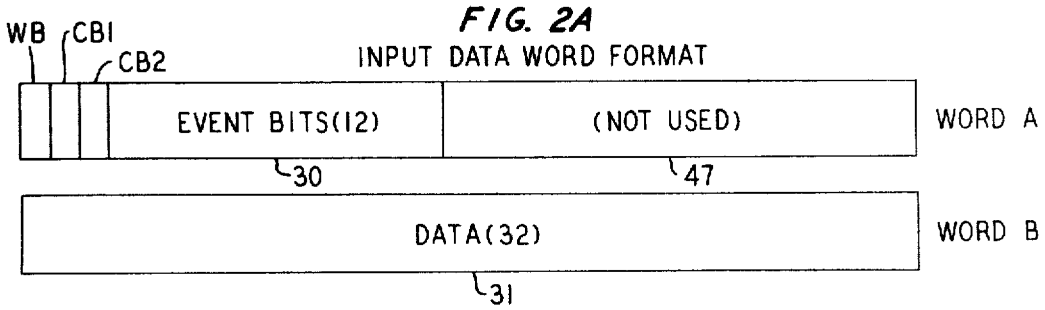
FIGS. 2A through 2E are graphical representations of binary word storage formats which are useful in explaining the implementation of the monitoring system of FIG. 1.

In FIG. 2A there is shown a graphical represention of two data input words representing a software event and appearing on leads 12 of FIG. 1. The first data input word of FIG. 2A, Word A, comprises a Word Bit (WB) indicating whether a single word or a double word is to be stored in the memory 23. The WB bit is followed by two Control Bits CB1 and CB2. Control bit CB1 indicates into which memory buffer (linear or circular) of store 23 the word should be stored. Control bit CB2 indicates if the word should be applied to the matcher logic section 14 or be stored without checking. These three bits are followed by a 12 bit event field 30 which identifies the software event in accordance with a prearranged code. This event may comprise, for example, the beginning of execution of particular subroutine loop entrance or exit, or any other programmed events which it is desired to monitor. The last seventeen bits of Word A in field 47 are not used. Word A is called the event word of the two-word data entry.

The second word, Word B, of the data entry of FIG. 2A comprises a single 32 bit data field 31 in which is stored data associated with the event identified in Word A, field 30. These data bits may comprise, for example, the contents of a particular storage register, or may comprise the current contents of a particular data storage location in memory. In any event, the data input words of FIG. 2A are assembled by the prior art computer 10 (FIG. 1) in response to the specific programmed instructions. Two such instructions, SOBA and FAST, are illustrated in the aforementioned J. S. Baynard et al U.S. Pat. No. 3,623,011, granted Nov. 23, 1971.

Figure 2B:
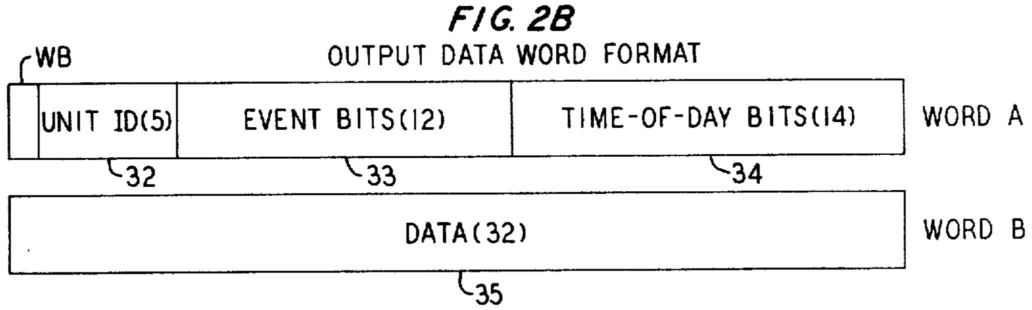

FIG. 2B there is shown a format of a data output entry including a first word, Word A, which comprises a WB bit, again indicating whether a one word or a two word entry is to be stored. This WB bit is followed by a five bit field 32 which serves to identify the unit from which the data word is derived. Thus, in a multiprocessor computer, an instruction can be executed by any one of a number of processor units. The identification of this unit is generated from the request from that unit to accept a data entry and is added to Word A of the data output entry of FIG. 2B. The 12 event bits of field 30 of the data input word are carried along to field 33 of the data output Word A as are the 32 data bits from field 31 carried along to field 35 of Word B. A 14 bit time-of-day tag is added to field 34 of Word A to indicate the time at which this software event entry was received.

In order to correlate all of the monitored events stored in the system of FIG. 1, it is necessary at certain times to store an indication of the current time. For example, since only the 14 least significant bits of the timing signal can be stored in the data entry of FIG. 2B, it is necessary to store a full 45 bit time-of-day signal at regular intervals to distinguish that various 14 bit time tags. The time-of-day word format of FIG. 2C is used for this purpose.

Figure 2C:
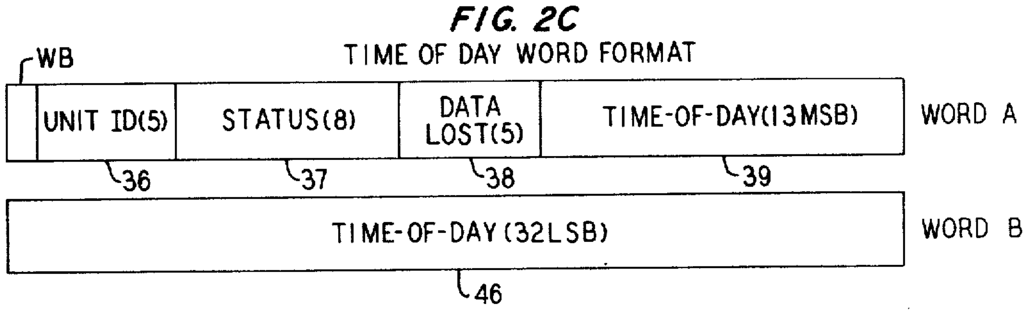

The time-of-day entry of FIG. 2C comprises a first word, Word A, including a unit identification field 36 of five bits, a status field 37 of eight bits, a data lost field 38 of five bits and the 13 least significant bits of a time-of-day code in field 39. The data lost field 38 specifies the number of input data words lost due to input overload since the last time-of-day word was generated. The eight status bits 37 indicate the gross errors and faults which have occurred in the operation of the monitor since monitor operation was initiated. These errors include such things as input parity errors, record over-write errors, power supply faults, and so forth.

Figure 2D:
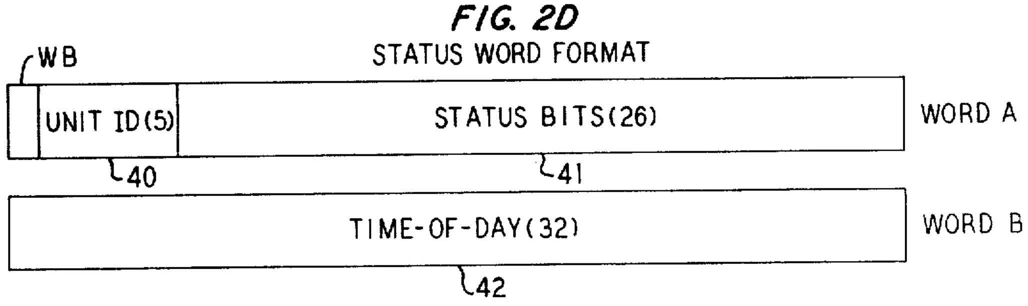

In FIG. 2D there is shown the format of a status entry which is used to represent in greater detail the internal status of the monitor unit itself. The status entry of FIG. 2D includes two words, Word A, which includes a status field 41 of 26 bits and Word B, which includes a time-of-day field 42 of 32 bits. This status entry can be stored at selected times to maintain a current record of the status of the monitor itself. Each bit of status field 41 represents a different status event.

Figure 2E:
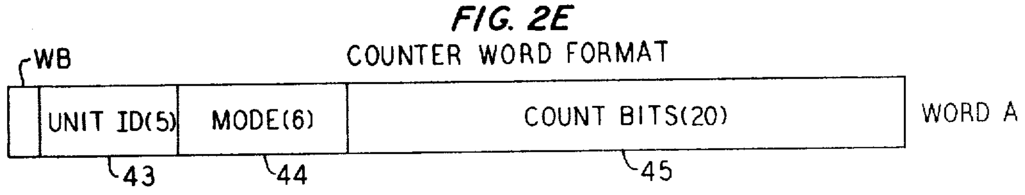

In FIG. 2E there is shown a format of a counter-output word. As was described, the monitor of FIG. 1 also serves to count hardware events which occur in the computer 10. A unit identification field 43 of five bits serves to identify which counter has been used and a mode field 44 of six bits serves to identify the particular mode in which that counter had been counting. Together, fields 43 and 44 serve to uniquely identify th event counted. The count field 45 includes a 20 bit count which represents either the number of events or accumulated time during or between events, which is stored in the identified counter.

Before proceeding to a more detailed description of the monitor system in accordance with the present invention, it will be first noted that all of the circuits of the monitor system are made up of a few basic types of logic circuits. Each of these basic types will be illustrated in detail and descriptions provided of their specific operations.

Thus, in FIG. 3A there is shown a detailed circuit diagram of a basic gate circuit 70 comprising a plurality of transistors 71 through 73, the bases of which are each connected to a corresponding one of input terminals 74 thorugh 76, and all of the collectors connected to a single output terminal 77 of the gate circuit 70. The biases from source 78 on the transistors 71 through 73 are arranged such that the voltage on output terminal 77 remains at a high voltage level only if all of the transistors 71 through 73 remain in an OFF condition.

An input signal at any one of input terminals 74 through 76 turns on the corresponding one of transistors 71 through 73 and thus reduces the voltage at output terminal 77 to near zero volts. If the high voltage condition is taken as binary "1" and the zero volt condition taken as a binary "0", the circuit of FIG. 3A can be described by the truth table of FIG. 3D, where FIG. 3D is limited to two input signals. The gate of FIG. 3A can be described alternatively as a NAND gate, illustrated schematically in FIG. 3B, or a NOR gate illustrated schematically in FIG. 3C. The Boolean expressions for the outputs of these gates are shown in the figures. This particular configuration was chosen as a basic gate because of the versatility of this basic logic function. Moreover, such basic gates are preferably fabricated in integrated circuit form and thus large numbers of such gates can be concentrated in very small physical areas.

In FIG. 4A there is shown a basic configuration of flip-flop circuit 80 comprising two transistors 81 and 82 cross-coupled in the basic multivibrator configuration and including input terminals 83 and 84 and having output terminals 85 and 86. Input terminals 83 may be termed the "set" input terminal while 84 may be considered the "clear" input terminal. Similarly, output terminal 85 may be considered the 1 output terminals and terminal 86 may be considered the 0 output terminal. The flip-flop symbol is illustrated in FIG. 4B. Such a flip-flop has the well-known properties of assuming either one of two stable states until triggered to the other state by an input trigger signal.

Figure 5A:
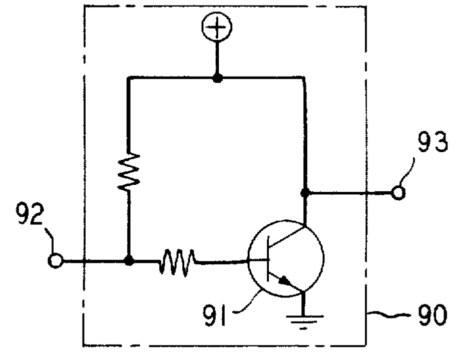
FIGS. 5A and 5B are a circuit diagram and symbols, respectively, of an inverter circuit, useful in realizing the circuits of the remainder of the drawings.
Figure 5B:
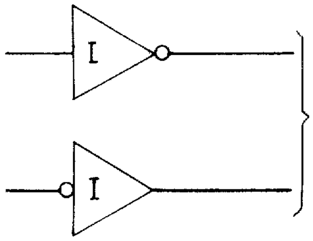

In FIG. 5A there is shown in inverter circuit 90 comprising a transistor amplifier 91 having an input terminal 92 and an output terminal 93. Input terminal 92 is connected to the base of transistor 91 while output terminal 93 is connected to the collector of transistor 91. The inverter circuit 90 has the property of producing, on its output terminal 93, a binary signal which is inverse of the binary signal at its input terminal 92. In FIG. 5B there are shown two alternative symbols representing the inverter circuit of FIG. 5A.

Figure 6A:
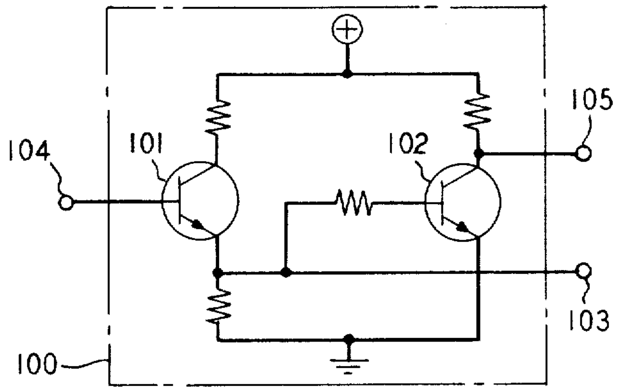
FIGS. 6A and 6B are a circuit diagram and symbol, respectively, of an emitter follower circuit, useful in realizing the circuits of the remainder of the drawings.
Figure 6B:
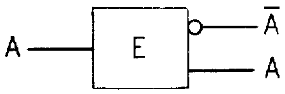

In FIG. 6A there is shown an emitter follower circuit 100 including transistors 101 and 102. Transistor 101 is connected in a standard emitter follower configuration and provides on output terminal 103 a signal identical to the signal at input terminal 104. Transistor 102 is connected in the standard common emitter configuration and provides, on output terminal 105, a signal which is inverse of the signal at terminal 103. The symbol of the emitter follower of FIG. 6A is shown in FIG. 6B.

Figure 7A:
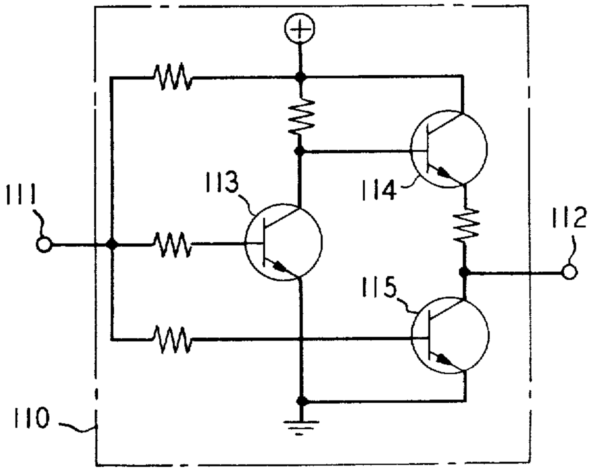
FIGS. 7A and 7B are a circuit diagram and symbol, respectively, of a cable driver circuit, useful in realizing the circuits of the remainder of the drawings.
Figure 7B:
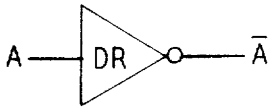

In FIG. 7A there is shown a circuit diagram of a cable driver 110 having an input terminal 111 and an output terminal 112. Included in driver circuit 110 are three transistors 113, 114 and 115. Together, these transistors form a two-stage power amplifier which is used to drive binary signals through lengths of cable to the various components of the monitoring system. The signal at output terminal 112, however, is the inverse of the signal at input terminal 111. A symbolic representation of the cable driver of FIG. 7A is shown in FIG. 7B.

Figure 8:
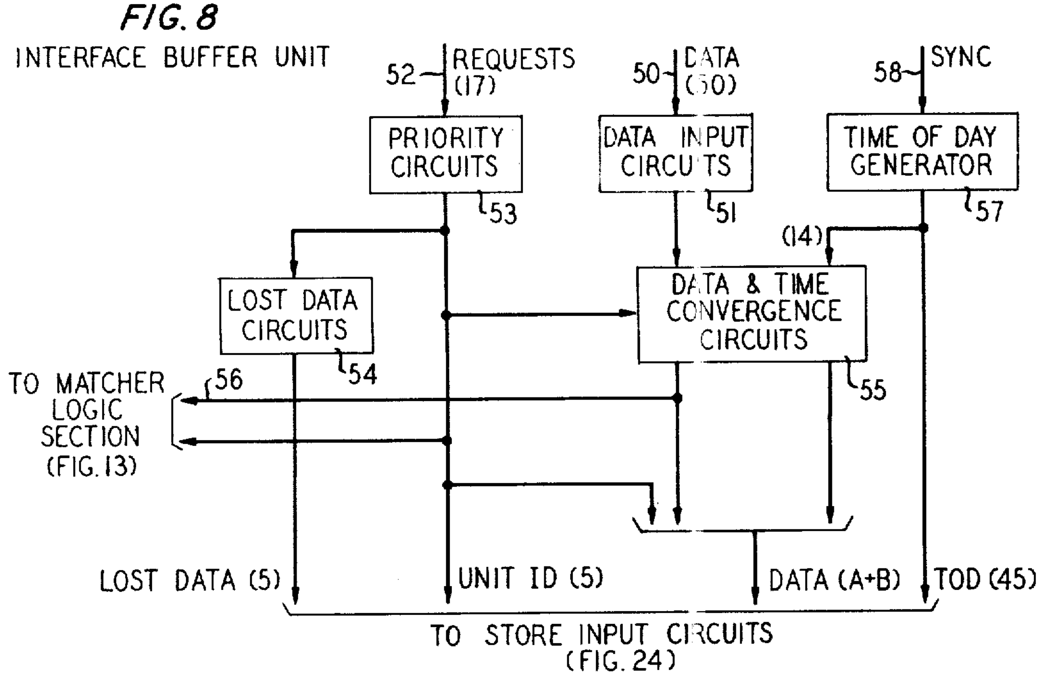
FIG. 8 is a more detailed block diagram of an interface buffer unit, useful in realizing the computer monitor of FIG. 1.

In FIG. 8 there is shown a more detailed block diagram of the interface buffer unit 13 shown in FIG. 1. In general, the interface buffer unit provides for the reception of all software event data words from the computer 10 of FIG. 1. These data words are received on input leads 50 and stored in data input circuits 51. At the same time, a request for service is received on corresponding ones of 17 input leads 52. These requests indicate which unit of the computer 10 is the source of the corresponding data word. These requests are applied to priority circuit 53 which determines which of these requests will be serviced first. Data lost circuits 54 maintain a count of the input data words which are lost due to overloads on the monitor system (successive requests not yet serviced). The selected word forms the output of data input circuits 51 and is applied to data and time convergence circuits 55. By way of leads 56, the data word is applied to the matcher logic section corresponding to section 14 of FIG. 1 and shown in more detail hereinafter in FIG. 13.

The interface buffer unit of FIG. 8 also includes a time-of-day generator 57 which utilizes timing signals 58 from the prior art computer 10 to generate time-of-day information, which, in turn, is utilized by data and time convergence circuits 55 to provide the various time tags represented in FIGS. 2B and 2D. These timing signals are also supplied to store input circuits 21 in FIG. 1, shown in detail in FIG. 8.

Figure 9:
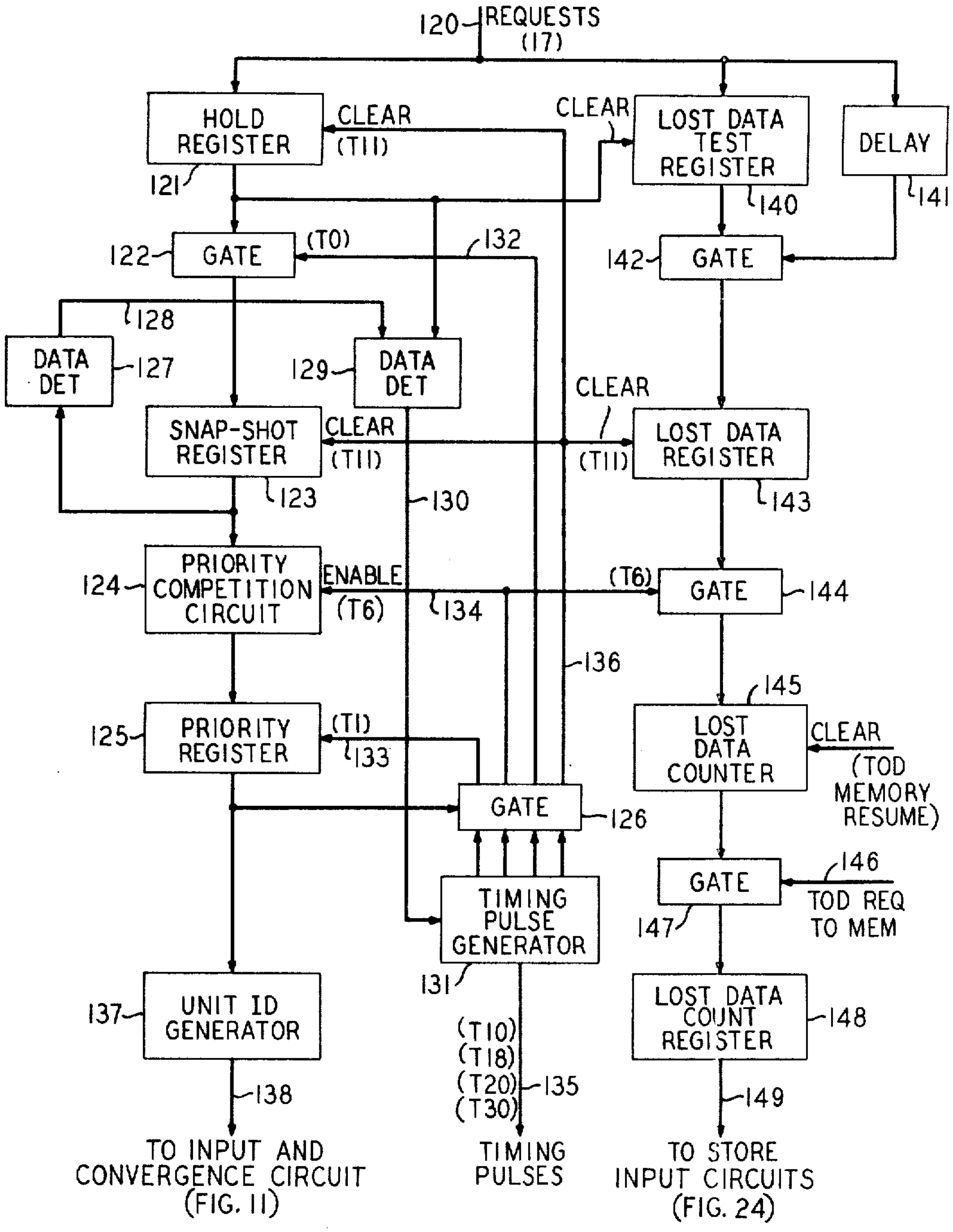
FIG. 9 is a more detailed block diagram of the priority and data lost circuits, useful in realizing the interface buffer unit of FIG. 8.

In FIG. 9 there is shown a detailed block diagram of the priority and data lost circuits shown as block 53 in FIG. 3. In general, priority is granted to the circuit having the highest priority simply by inhibiting each priority circuit by requests from all higher priority circuits. Thus a request on one of leads 120 in FIG. 9 is applied to Hold register 121. Hold register 121 includes one flip-flop for each of 17 requests lines 120, each flip-flop being set by the appearance of a request on the corresponding line. The outputs of Hold register 121 are applied by way of gates 122 to Snap-Shot register 123.

The outputs of Snap-Shot register 123, are, in turn, applied to priority competition circuit 124. Circuit 124 responds to all the requests which have been registered in Snap-Shot register 123 and, in response to an enabling signal on lead 134, selects that request having the highest priority. This function can most simply be accomplished by utilizing inhibit gates for each Snap-Shot output. Each inhibit gate is inhibited by all of the outputs of Snap-Shot register 123 which are of higher priority than the output corresponding to the given gate.

As a result of this priority competition, a single Snap-Shot signal is transferred to priority register 125 and corresponds to the highest priority request present in Snap-Shot register 123. The one-out-of-17 output of priority register 125 is used to operate one of 17 gate circuits 126 corresponding to the 17 request leads. Gate circuits 126 gate appropriate timing pulses to the priority circuits. These timing pulses are illustrated in more detail in FIG. 10 and will be described in detail hereinafter.

A data detecting circuit 127 is connected to the outputs of Snap-Shot register 123 to detect the presence of a request in any flip-flop of the Snap-Shot register 123. If such a request is present, a signal appears on output lead 128 which is, in turn, applied to data detection circuit 129. Also applied to data detection circuit 129 are the outputs of Hold register 121. A signal on output lead 130 from detector 129 therefore indicates that a request is present in either Hold register 121 or Snap-Shot register 123. In either event, an enabling signal is applied to timing pulse generator 131 to initiate the generation of a sequence of timing pulses as shown in FIG. 10.

Figure 10:
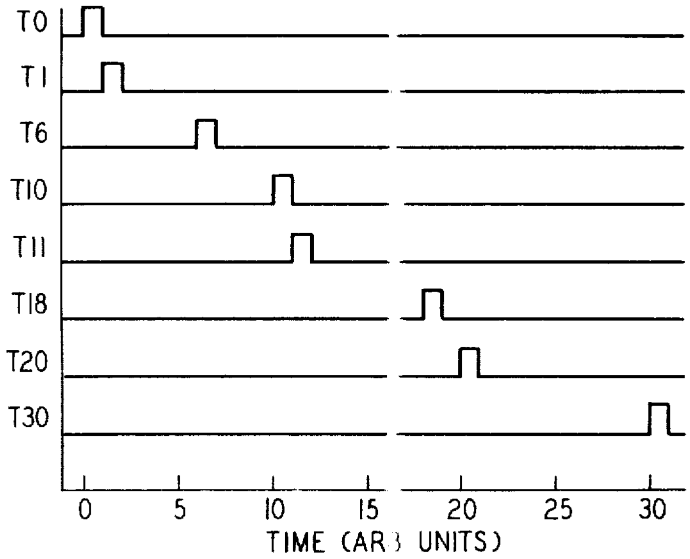
FIG. 10 is a graphical representation of certain timing pulses, useful in explaining the operation of the circuits of FIG. 9.

The first timing pulse (T0) of FIG. 10 is applied by way of lead 132 to operate gate 122 and transfer any requests in Hold register 121 to Snap-Shot register 123. The next timing pulse (T1) is used on lead 133 to clear the priority register 125 of the previous priority determination and prepared for the next cycle of priority determination. The next timing pulse (T6) is used on lead 134 to enable priorty competition circuit 124 and thus permit a new priority determination to take place. The T10 timing pulse is applied by way of leads 135 to initiate a request to the matcher logic section 14 of FIG. 1 to prepare for the reception of the selected data word. The T11 timing pulse is used on lead 136 to clear the appropriate stages of Hold register 121 and Snap-Shot register 123, each at the flip-flop corresponding to the request which has just been serviced, and thus preparing the way for a new request on that same lead. The T18 timing pulse and T20 timing pulse appear on leads 135 and are both used in other parts of the monitor system for timing purposes. The T30 timing pulse represents the end of the priority determination interval and is thus used to permit the initiation of a new priority determination cycle.

The output of priority register 125 is also applied to a unit identification generator 137. Generator 137 generates, from the one-out-of-17 input signals, a binary coded identification of the requester. This five bit identity code is transferred by way of leads 138 to the input and convergence circuits of FIG. 11 there to be combined with the data fields and timing fields to form the output data word of FIG. 2B.

The requests on leads 120 are also applied to a lost data test register 140. Each request is registered in a separate flip-flop in test register 140. That flip-flop is cleared with the same request is registered in Hold register 121. Should Hold register 121 already be occupied by a previously received request, the lost data test bit is not cleared and, after a delay by the delay circuit 141, is gated through gate 142 to lost data register 143. A T6 timing pulse in the same timeslot that evaluates priority in priority competition circuit 124 also enables gate 144 to apply the lost data bit from lost data register 143 to increment lost data counter 145.

Figure 12:
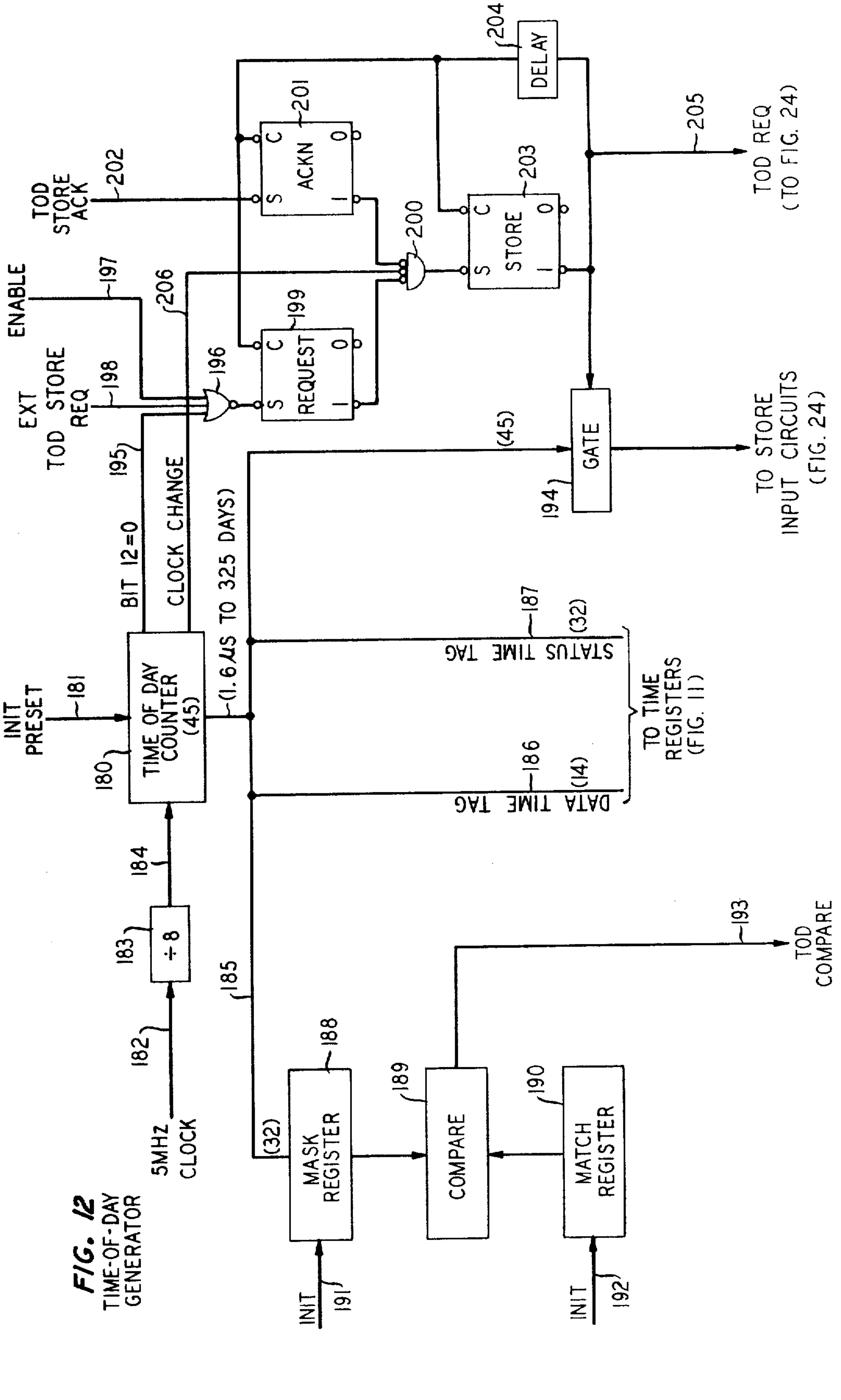
FIG. 12 is a detailed circuit diagram of a time-of-day generator, useful in realizing the interface buffer unit of FIG. 8.

Each time a time-of-day entry is to be stored in store 23 of FIG. 1, as determined by a signal on lead 205 in FIG. 12, a memory request on lead 146 operates gate 147 to transfer the current count in counter 145 to lost data count register 148. This lost data count is applied by way of leads 149 to the Word A time-of-day register in FIG. 24 in accordance with the format of FIG. 2C.

It can be seen that the circuit of FIG. 9 operates to register each request for storage of a software event, to select the highest priority event and to maintain a count of requests which have not been serviced due to the incomplete servicing of a previous request from the same source. The circuits of FIG. 9 also generate in generator 137 the unit identification code used for each data entry.

Figure 11:
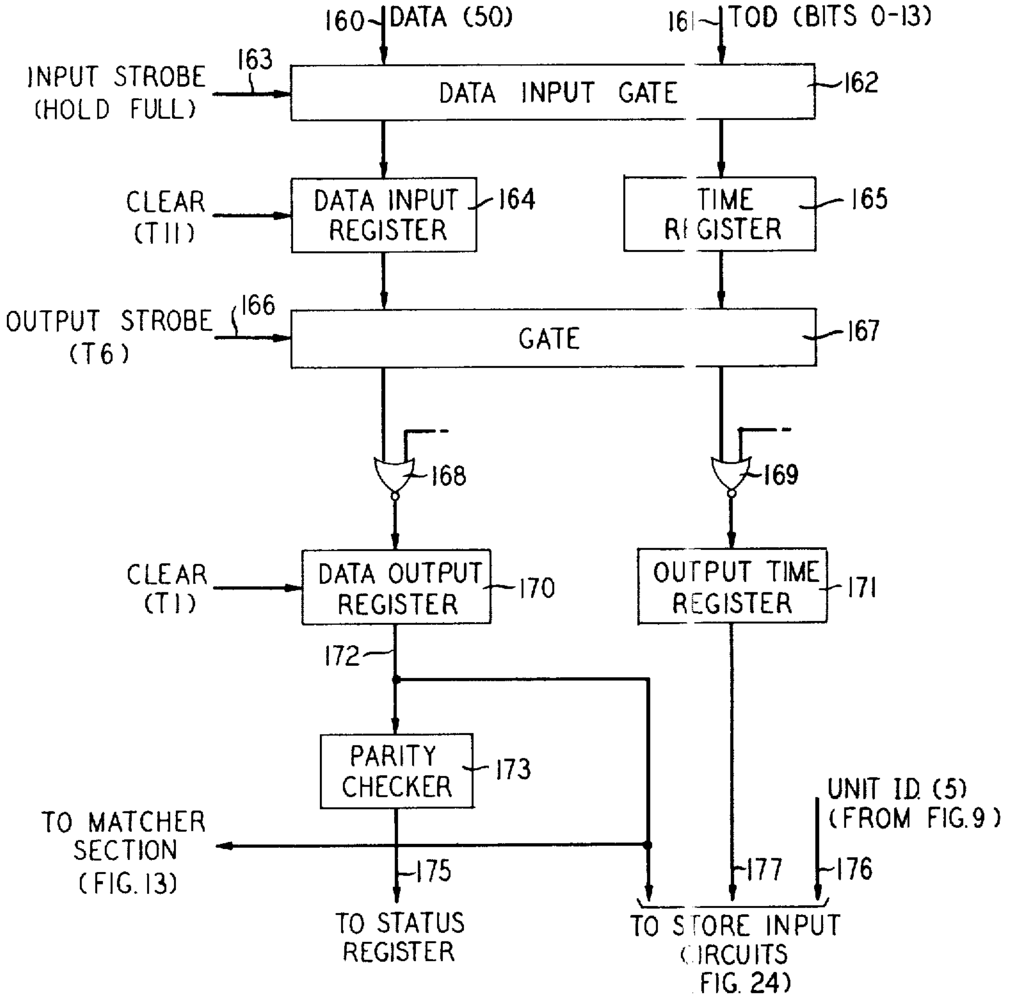
FIG. 11 is a more detailed block diagram of the data input and convergence circuits, useful in realizing the interface buffer unit of FIG. 8.

In FIG. 11 there is shown data input and convergence circuits suitable for circuits 51 and 55 of FIG. 8. Fifty data bits corresponding to the input data words of FIG. 2A appear on input leads 160. Fourteen timing bits simultaneously appear on leads 161 from a time-of-day generator to be discussed in connection with FIG. 12. All of these signals are applied to data input gate 162. When gate 162 is operated by a signal on lead 163, indicating that a request has been stored in the corresponding hold flip-flop of the Hold register 121 (FIG. 9), gate 162 operates to store the 50 data bits in data input register 164 and the 14 timing bits in timing register 165.

If this registered data word is selected as the one having the highest priority, a T6 timing pulse will appear on control lead 166 to operate gate 167. Each of the 50 data leads is applied by way of gate 167 to a NOR combining circuit such as NOR gate 168. Simultaneously, each of the 14 timing leads is applied by way of gate 167 to a NOR combining circuit such as NOR gate 169. The other inputs to gates 168 and 169 are derived from 16 other data and time registers which have registered corresponding data and timing signals for other requests. Only the data corresponding to the selected request is stored in data output register 170. Similarly, only the timing signals corresponding to the selected request are stored in output time register 171.

Figure 13:
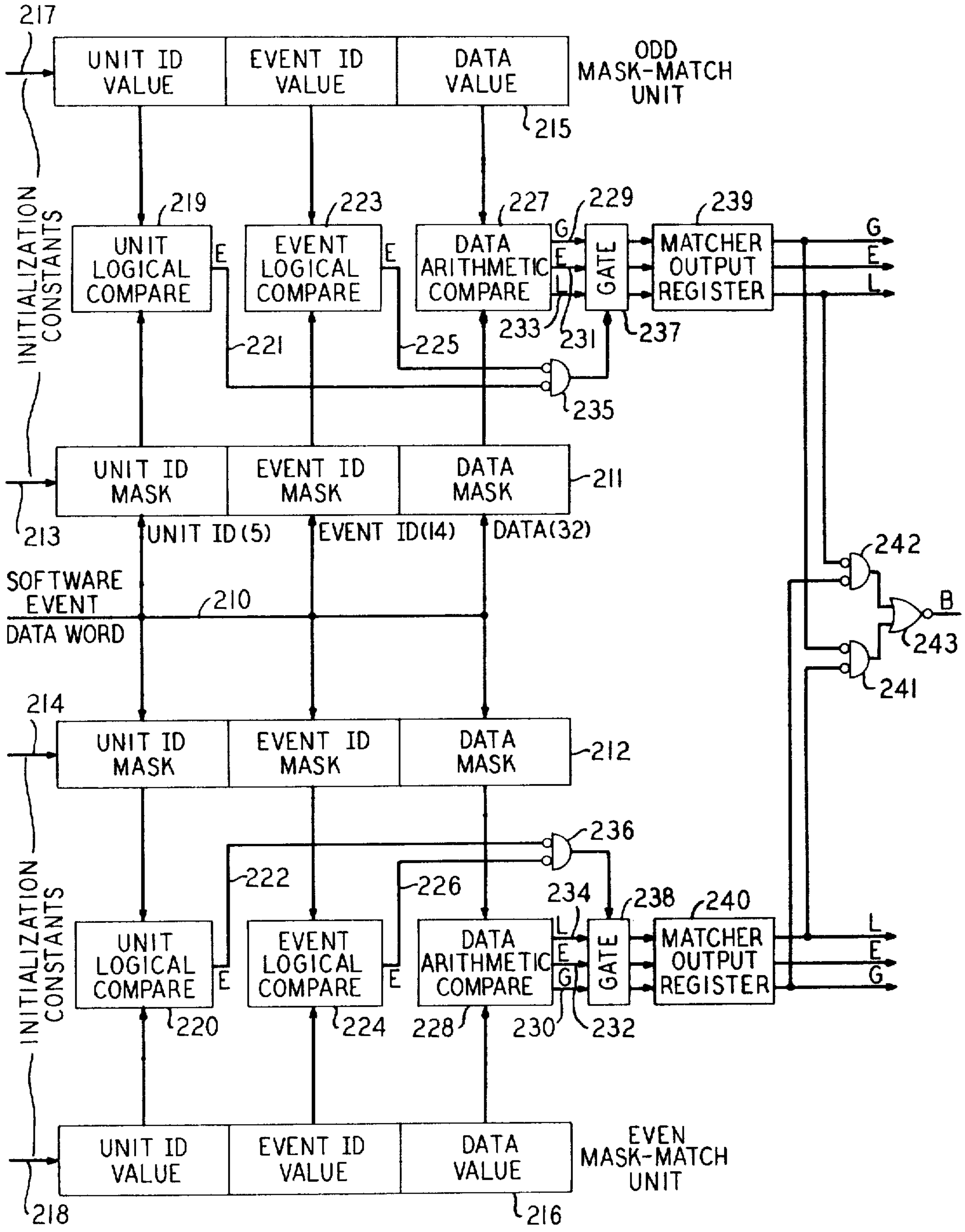
FIG. 13 is a general block diagram of the matcher logic section, useful in realizing the computer monitor of FIG. 1.
Figure 24:
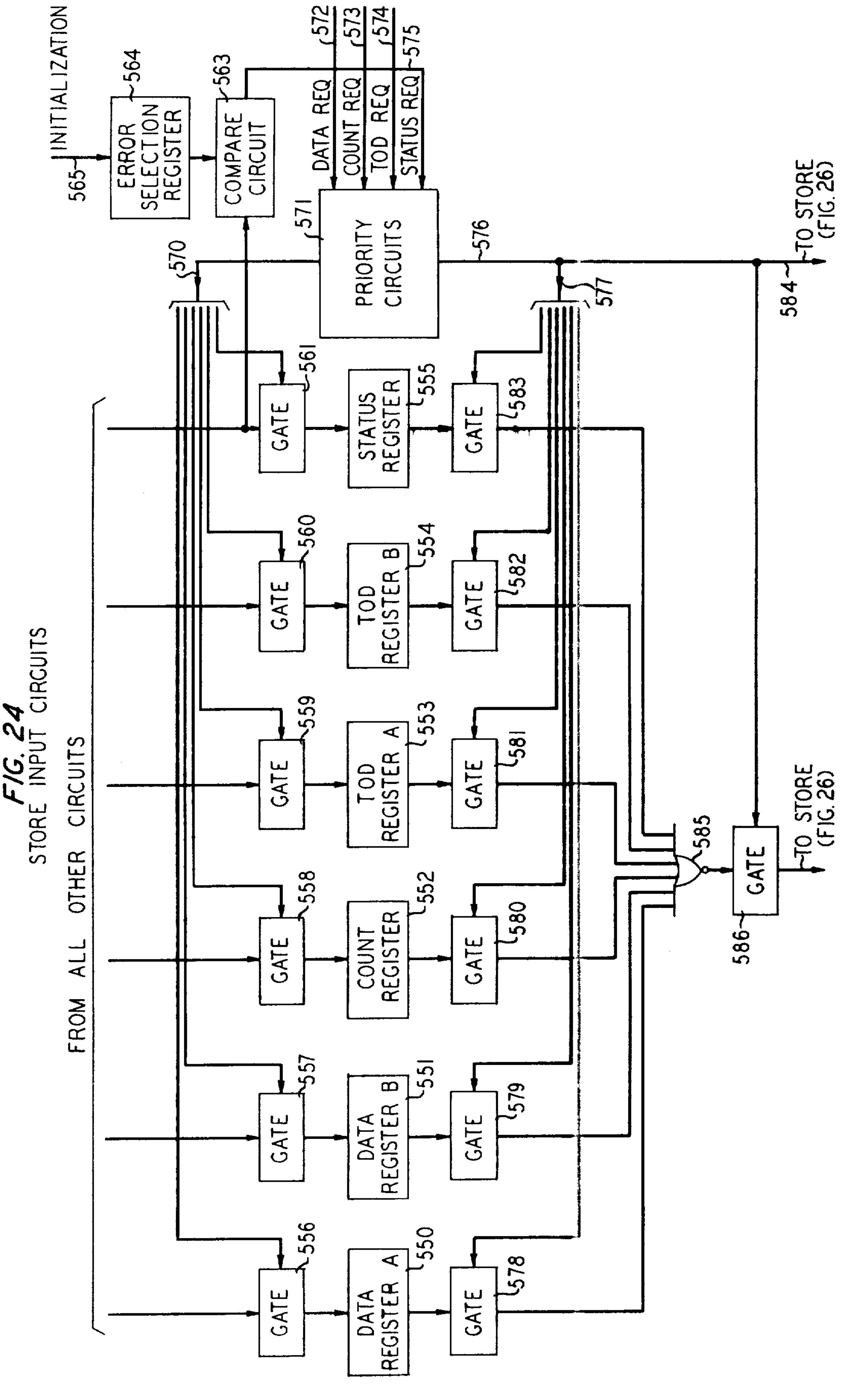
FIG. 24 is a detailed block diagram of the store input circuits necessary to realize the computer monitor of FIG. 1.

The outputs of data register 170 on leads 172 are supplied to the matcher section of FIG. 13, to a parity checker 173 and to the store input circuits of FIG. 24. Parity checker 173 checks the parity of the data word in register 170 and, when appropriate, transfers a parity error signal on lead 175 to the status register 555 of FIG. 24. The unit identification signal from FIG. 9 is also applied by way of leads 176 to the store input circuits of FIG. 24. Finally, the time tag from register 171 is applied by way of leads 177 to the store input circuits of FIG. 24.

It can be seen that the signals from FIG. 11 comprise a single WB bit, five unit identification bits, 12 even bits, 14 timing bits and 32 data bits, all in the format of FIG. 2B. These fields are assembled in the data word registers 550 and 551 of FIG. 24, as will be described hereinafter.

In FIG. 12 there is shown a time-of-day generator circuit comprising a time-of-day binary counter 180 including 45 bit positions. Counter 180 is initially preset by preset signals on lead 181 to match the time-of-day counter in the prior art computer 10 of FIG. 1. Counter 180 is driven by five megahertz clock pulses on lead 182 which are applied to pulse divider 183. The resulting 625 kilohertz signals on lead 184 advance counter 180 every 1.6 microseconds. Having 45 counting positions, counter 180 therefore turns over once every 365 days. The binary coded timing signals from counter 180 are supplied to timing bus 185.

The 14 least significant timing signals from counter 180 are supplied by way of leads 186 as a time tag to FIG. 11 for insertion into the output data Word A shown in FIG. 2B.

The 32 least significant bits from counter 180 are supplied by leads 187 to provide the time-of-day information in Word B of the status word entry shown in FIG. 2D. The 32 least significant bits from counter 180 are also supplied through a mask register 188 to a compare circuit 189. Also supplied to compare circuit 189 is a preselected timing code in match register 190. Both mask register 188 and match register 190 are initialized by way of leads 191 and 192, respectively. It is thus possible to provide a compare signal on lead 193 each time the counter 180 reaches the preselected count in register 190 as modified by the requirements of mask register 188. Each bit set in mask register 188 removes the corresponding bit from the comparison in compare circuit 189 and thus permits the comparison to take place only on the selected remaining bits. The time-of-day compare signal on lead 193 can be used for many timing functions such as enabling the monitor or initiating a store request in FIG. 24.

All 45 output signals from counter 180 are applied to gate 194 and thence to the store input circuits to be described in connection with FIG. 24. Gate 194 is operated each time a time-of-day entry is to be made in the store 23 of FIG. 1.

Time-of-day entries are made as previously described each time bit 12 of counter 180 changes to zero. A signal signifying this event appears on lead 195 and is applied to NOR gate 196. Each time the monitor system of FIG. 1 is enabled, a signal appears on lead 197 which is also applied to NOR gate 196 to initiate a time-of-day entry. Finally, an external control can be used on lead 198 to request a time-of-day entry and this signal is also supplied to NOR gate 196.

The output of NOR gate 196 is supplied to the set input of flip-flop 199, the 1 output of which is connected to NAND gate 200. Also connected to NAND gate 200 is a signal on lead 206 indicating that the clock pulse from lead 184 is changing and thus counter 180 is in the process of changing state. This signal is used to inhibit NAND gate 200 and prevent reading counter 180 during the transition interval. Also applied to NAND gate 200 is the 1 output of flip-flop 201 which is set by a signal on lead 202 indicating that the previous time-of-day entry has been completed.

When fully enabled, NAND gate 200 sets flip-flop 203 which, in turn, enables gate 194 and, after a delay in delay line 204, resets flip-flops 199, 201 and 203. The signal on lead 205 initiates a storage operation in store 23 (FIG. 1) as will be hereinafter described in connection with FIG. 24.

In FIG. 13 there is shown the detailed block diagram of the matcher logic section 14 shown in FIG. 1. Sixteen matcher logic sections are provided, arranged in eight groups of two sections each. One such group of two sections is illustrated in FIG. 13. In FIG. 13 the data word from FIG. 8 on leads 56 is supplied on leads 210. As previously noted, the input data includes 32 bits of data signals and 14 bits of event identification signals. To this are added five bits of unit identification signals from lead 138 of FIG. 9.

Mask registers 211 and 212 each includes 49 bit positions divided into three fields of 32, 12 and five bits, respectively. These fields correspond to the data, event identification and unit identification signals, respectively. Mask registers 211 and 212 are initialized by signals on leads 213 and 214, respectively, and have the effect of forcing a match for each bit set in the mask register regardless of the actual value of the data signal on leads 210.

Match registers 215 and 216 are also provided and include 49 bits each divided into three fields of 32, 12 and five bits, respectively. Match registers 215 and 216 are initialized by signals on leads 217 and 218, respectively, and provide values to which the data signals on leads 210 are compared. The unit identification signals, for example, are compared in compare circuits 219 and 220 and, when they are equal, provide an output signal on leads 221 and 222, respectively. Similarly, the event identification signals are compared in compare circuits 223 and 224 and provide output signals on leads 225 and 226, respectively, when the signals being compared are identical.

It will be noted that compare circuits 219, 220, 223 and 224 provide only single outputs indicating exact equality or lack thereof. The data values which are compared in compare circuits 227 and 228, on the other hand, are compared arithmetically and three output signals are provided to indicate that the data signal is greater than (on leads 229 and 230), equal to (on leads 231 and 232) or less than (on leads 233 and 234) the data values registered in match registers 215 and 216, respectively.

In order for a data event to match the initialization values, the unit and event identifications must be identical. This condition is detected in NAND gates 235 and 236, respectively. NAND gate 235 has applied thereto the output of compare circuit 219 on lead 221 and the output of compare circuit 223 on lead 225 and has its output, in turn, connected to gate circuit 237. NAND gate 236, on the other hand, has applied thereto the output of compare circuit 220 on lead 222 and the output of compare circuit 224 on lead 226 and supplies its output to gating circuit 238.

The output of gate 237 is supplied to matcher output register 239, while the output of gate 238 is supplied to matcher output register 240. The contents of registers 239 and 240 therefore indicate the results of the match operation for the two matcher sections shown in FIG. 13. It will be appreciated that 14 other matcher sections are provided to which the same data signals are supplied on leads 210 but each of which may be initialized differently by means of the signals on leads 213, 214, 217 and 218. The entire matcher logic section therefore provides 16 sets of signals representing the "greater than", "equal to" and "less than" conditions.

In addition, these 16 matcher sections are arranged in groups of two to provide the further indication that data signals lie between the two values initialized in registers 217 and 218. To this end, the greater than lead from register 239 and the less than lead from register 240 are supplied to NAND gate 241. Similarly, the greater than signal from register 240 and the less than signal from register 239 are supplied to NAND gate 242. The outputs of NAND gates 241 and 242 are supplied to NOR gate 243, the output of which indicates that the data word received has a value lying between the initialization values in registers 215 and 216. It will be noted that this "between" signal only arises for those events having identical unit identifications and identical event identifications, in addition to having a data value lying in the required range of values.

Figure 14:
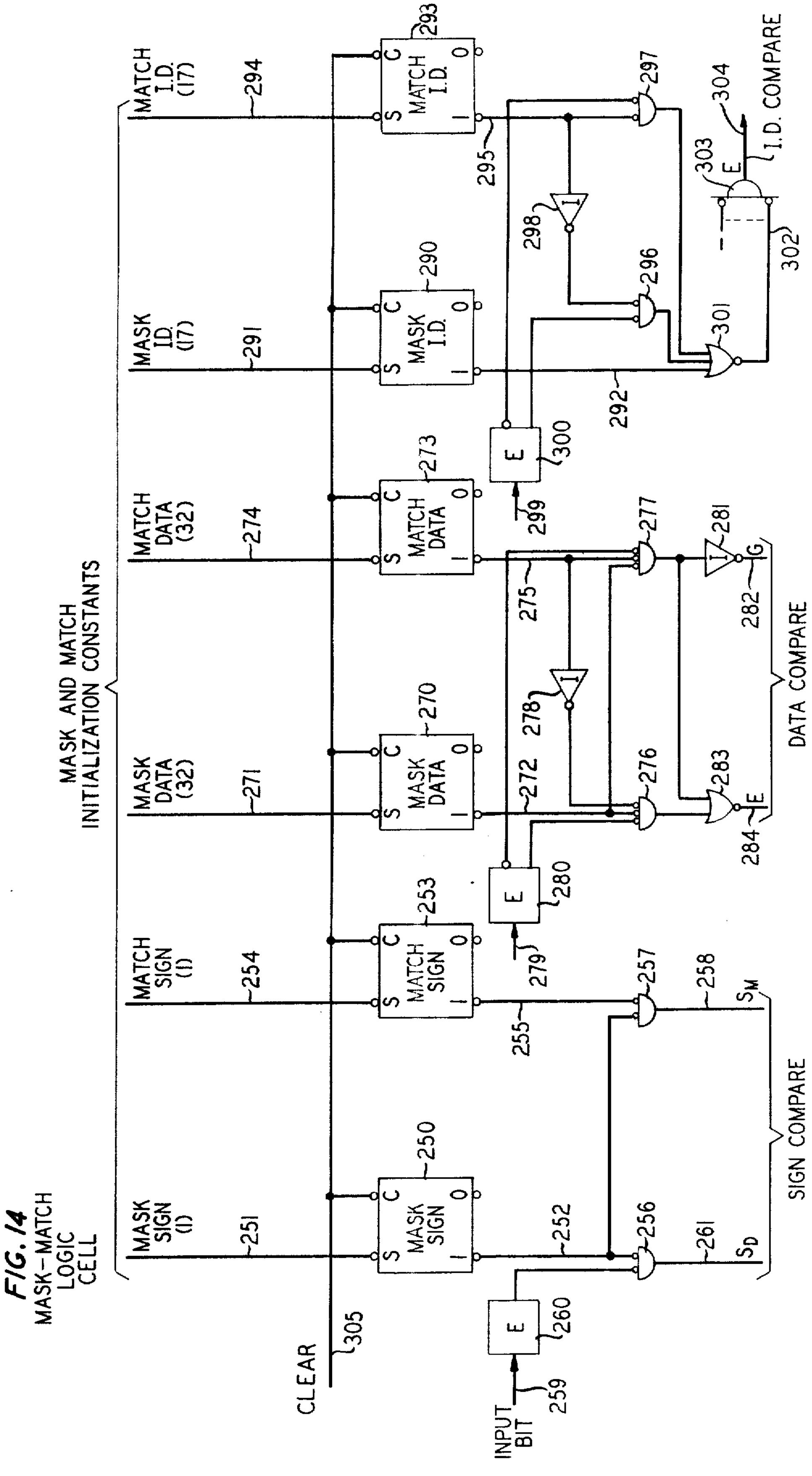
FIG. 14 is a detailed circuit diagram of the various types of mask-match logic cells, useful in implementing the matcher logic section of FIG. 13.

In FIG. 14 there is shown a detailed circuit diagram of exemplary stages of the mask and match logic circuits required to implement the matcher logic section of FIG. 13. Thus, each data word is made up of a sign bit and 31 data bits. The mask sign on flip-flop 250 thus receives a mask sign signal on lead 251 which sets flip-flop 250 to provide an output on lead 252. The match sign flip-flop 253 similarly receives a match sign signal on initialization lead 254 which sets flip-flop 253 to provide an output signal on lead 255.

Output lead 252 from flip-flop 250 is supplied to NAND gates 256 and 257. The output from flip-flop 253 on lead 255 is supplied to the second input of NAND gate 257. When fully enabled, NAND gate 257 provides an output on lead 258.

The data signal sign bit appearing on lead 259 is applied to emitter follower circuit 260, the output of which is supplied to the remaining input of NAND gate 256. When fully enabled, NAND gate 256 provides an output on lead 261.

It can be seen that an output on lead 258 indicates a positive sign bit to be matched or that the sign bit is masked. A signal on output lead 261, on the other hand, indicates either a positive sign bit on the data signal or an indication tha the sign bit has been masked. The two signals on leads 261 and 258, representing the results of the sign compares, are supplied to FIG. 15, as hereinafter described.

The mask data flip-flop 270 is set by initialization signal on lead 271 to provide an output on lead 272. The match data flip-flop 273 is similarly set by an initialization signal on lead 274 to provide an output signal on lead 275.

The output of mask data flip-flop 270 is applied to NAND gates 276 and 277 while the output of match data flip-flop 273 is supplied directly to NAND gate 277 and, after inversion in inverter 278, to NAND gate 276. The data signal appearing on input lead 279 is applied to emitter follower circuit 280, the output of which provides the third input to NAND gate 276. The inverted output from emitter follower 280 provides the third input to NAND gate 277.

The output of NAND gate 277, after inversion in inverter circuit 281, provides an indication that the data input bit is greater than the match data signal and this indication appears an output lead 282. The outputs of NAND gates 276 and 277 are combined in NOR gate 283 to provide an output signal on lead 284 indicating that the data signal and the match signal are equal or that this bit position is masked.

Thirty-one mask data and 31 match data flip-flops and compare circuits are provided for each of 16 matcher logic sections. The arithmetic comparison is completed in the data compare circuits shown in detail hereinafter in FIG. 15.

The mask identification flip-flop 290 is set by a mask identification initialization signal on lead 291 to provide an output signal on lead 292. The match identification flip-flop 293 is set by a match identification signal on initialization lead 294 to provide an output signal on lead 295. The output from match ID flip-flop 293 on lead 295 is applied directly to NAND gate 297 and, after inversion in inverter 298, to NAND gate 296. An identification signal on lead 299 is applied to emitter follower circuit 300, the output of which provides a second input to NAND gate 296. The inverted output from emitter follower 300 provides the second input to NAND gate 297.

The outputs of NAND gates 296 and 297, together with the output of mask identification flip-flop 290 on lead 292 are all supplied to NOR gate 301 to provide an output signal on lead 302. This output signal on lead 302 indicates an identification bit match and provides one input to NAND gate 303. The remaining inputs to NAND gate 303 comprise similar outputs from the other 16 mask-match logic cells for the remaining identification digits. It will be recalled that 17 identification bits are used, five unit identification bits and 12 event identification bits. The output on lead 304 from NAND gate 303 indicates that all of these identification bits are equal and thus can be used to operate a gate corresponding to gates 237 and 238 in FIG. 13.

All of the flip-flop in FIG. 14 can be reset by a clear signal on lead 305 in preparation for new initialization constants. Such clearance takes place whenever it is desired to replace the initialization constants in preparation for a new monitoring session.

Figure 15:
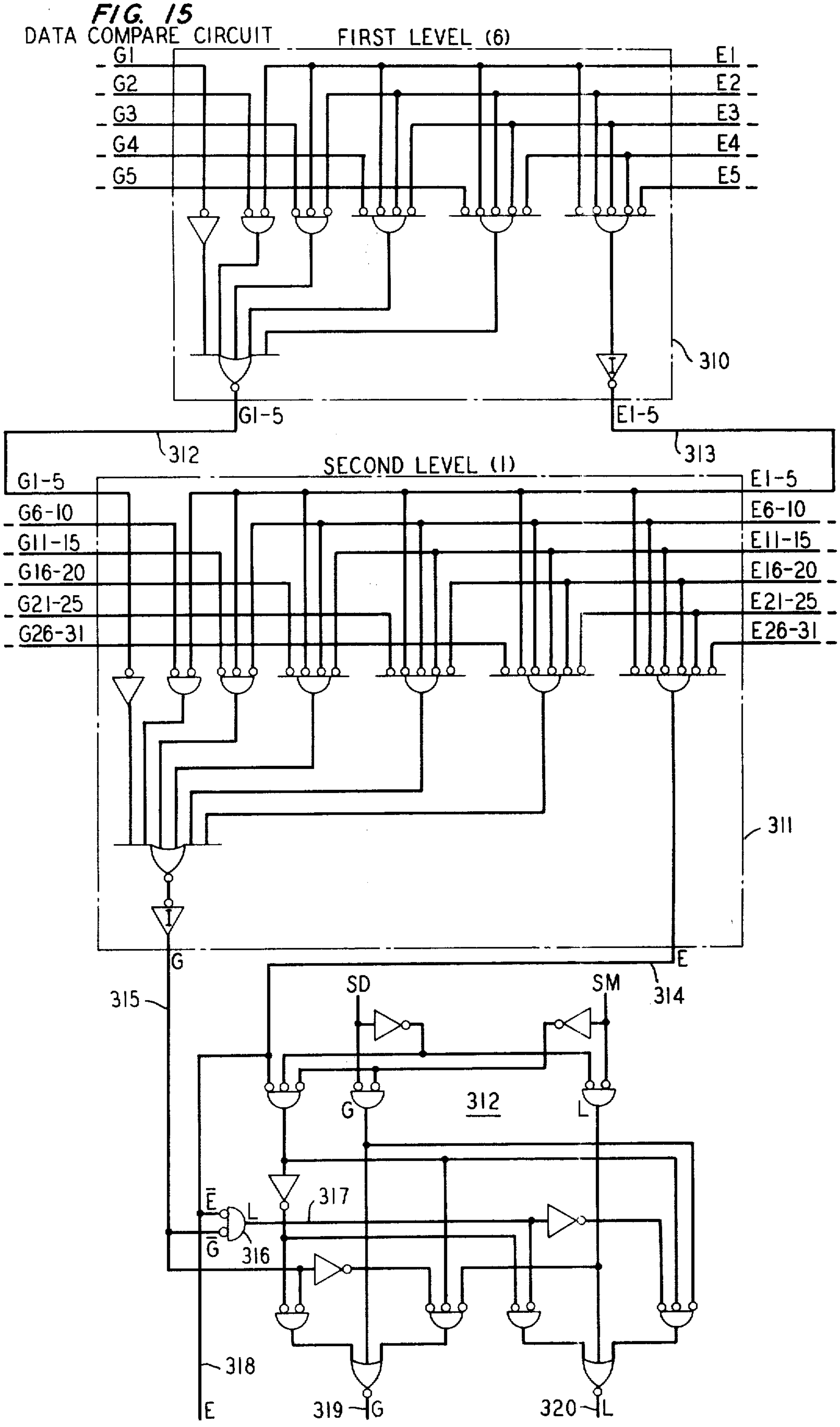
FIG. 15 is a detailed circuit diagram of the data compare circuits, useful in realizing the matcher logic section of FIG. 13.

In FIG. 15 there is shown a detailed circuit diagram of the arithmetic compare circuit suitable for use in the matcher logic section of FIG. 13. The data compare circuit of FIG. 15 comprises six first level compare circuits, similar to compare circuit 310, and a single second level compare circuit 311 together with the sign modification circuits 312. It will be noted that first level compare circuit 310 has applied thereto the outputs of five digit compares corresponding to leads 282 and 284 in FIG. 14. The remainder of the 31 data compare signals are arranged in groups of five, each group applied to a first level compare circuit identical to circuit 310. It will be seen that output lead 313 from circuit 310 indicates that all of the five input signals are equal while an output on lead 312 indicates that these five least significant digits of the data signal are greater than the five least significant digits of the match value.

The various first level output signals corresponding to output leads 312 and 313 are applied to second level compare circuit 311 which provides an output on lead 314 indicating that all 31 data bits are equal to the match data bits, or an output on lead 315 indicating that all 31 data digits are greater than the corresponding 31 initialization digits. The signal on leads 314 and 315 are combined in NAND gate 316 to provide an output on lead 317 indicating that the data signal is neither greater than nor equal to the initialization value and thus is less than the initialization value.

Since negative numbers are represented in 2's complement form, the sign match values from leads 258 and 261 (FIG. 14) are used to modify the signals on leads 314, 315 and 317 as indicated in circuit 312. The final match results appear on output leads 318, 319 and 320 representing the equal to, the greater than and the less than results, respectively.

It will be recalled that 16 different matcher logic sections are provided to generate 16 different sets of E, G and L signals and that an additional eight B signals are generated indicating that an input data signal lies between two selected initialization values. These signals are used as controls in filter circuits to permit or prevent the occurrence of a particular monitoring function. Such a basic filter circuit is shown in FIG. 16.

Figure 16:
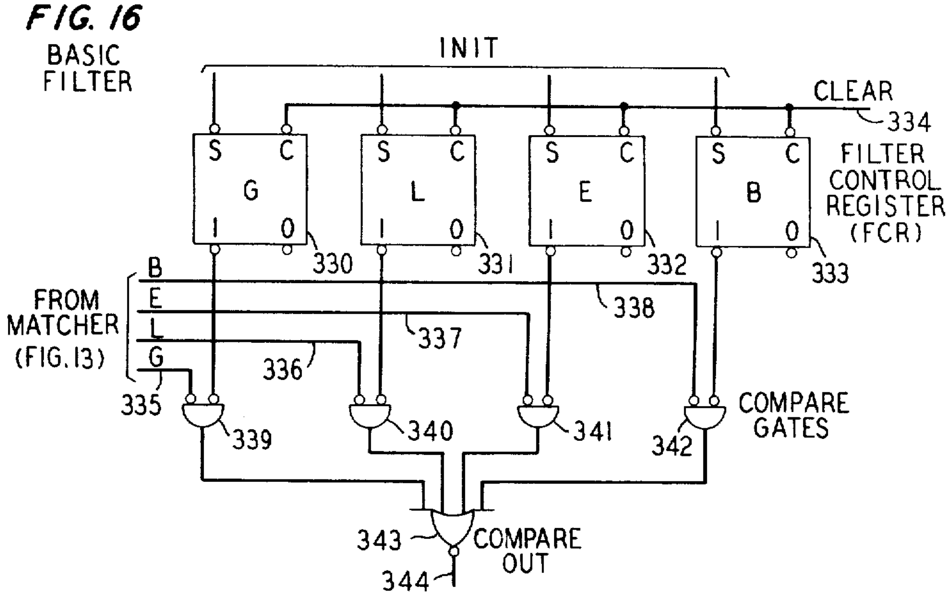
FIG. 16 is a detailed circuit diagram of a basic filter arrangement, useful in realizing the counter control filters and store control filters of the computer monitor of FIG. 1.

Thus, in FIG. 16 there is shown a basic filter circuit comprising a filter control register including four flip-flops 330, 331, 332 and 333. Each of these flip-flops is set by an appropriate initialization signal before a monitor run and is cleared by a signal on lead 334 after a monitor run. The G, L, E and B signals from the matcher section of FIG. 13 appear on leads 335, 336, 337 and 338, respectively. These two sets of signals are compared in compare gates 339, 340, 341 and 342, the outputs of which are combined in NOR gate 343 to provide an output signal on lead 344 each time any one of the matcher signals is identical to the corresponding initialization signal.

It is thus possible to preset in flip-flop 330 through 333 the particular condition for which a match is desired and to use that matched condition to provide an output control signal on lead 344. The use of these control signals will be further described in connection with FIGS. 17 and 18.

Figure 17:
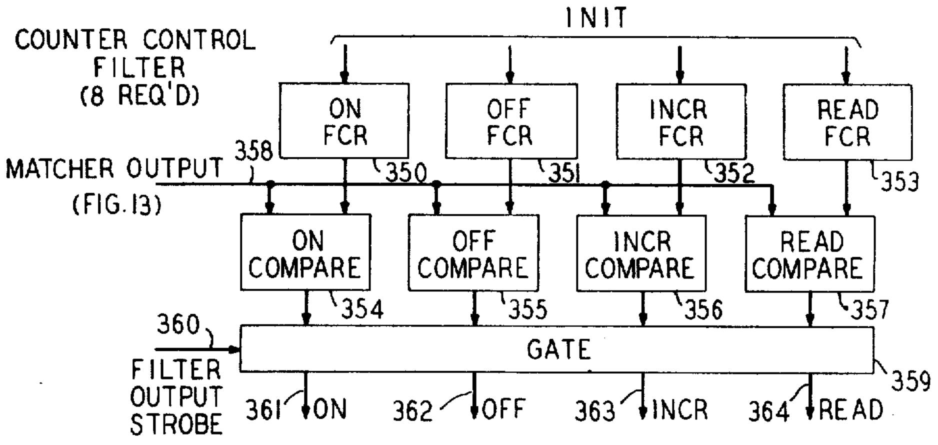
FIG. 17 is a block diagram of one of eight counter control filters necessary to realize the computer monitor of FIG. 1.

In FIG. 17 there is shown how four basis filters similar to FIG. 16 are combined to form a counter control filter, eight of which are required in the monitoring system of FIG. 1. Four filter control registers 350, 351, 352 and 353 are provided bo correspond, respectively, to four controls exercised over the counters to be described hereinafter. These four control signals include ON, OFF, INCREMENT and READ signals.

The outputs of filter control registers 350 through 353 are applied, respectively, to corresponding compare circuits 354, 355, 356 and 357. The other inputs to these compare circuits on leads 358 correspond to the G, L, E and B outputs from the matcher section of FIG. 13. The outputs from all of the compare circuits 354 through 357 are applied to a gating circuit 359 which, when operated by a control signal on lead 360, provides the appropriate ON control signal on lead 361, an OFF control signal on lead 362, an INCREMENT control signal on lead 363 or a READ control signal on lead 364. The use of these counter control signals will be described in connection with FIG. 23 hereinafter.

Figure 18:
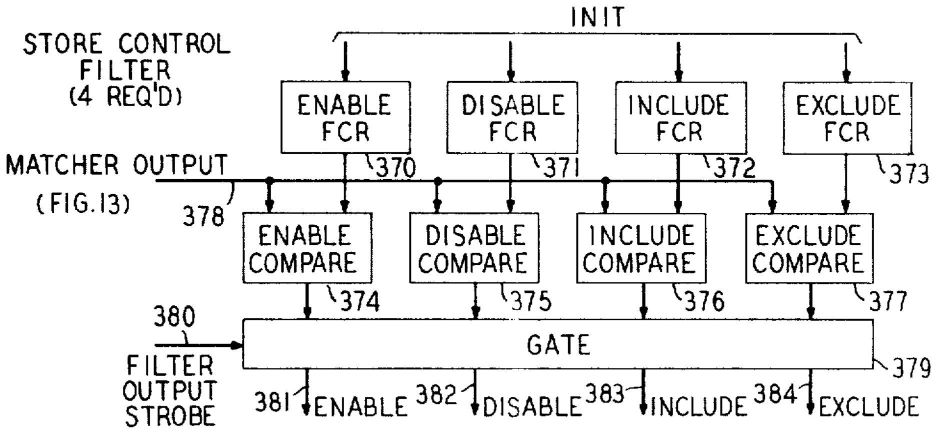
FIG. 18 is a block diagram of one of four store control filters, required to implement the computer monitor of FIG. 1.

In FIG. 18 there is shown a store control filter, four of which are required for the monitoring system of FIG. 1. These store control filters include four filter control registers 370, 371, 372 and 373 which correspond to ENABLE, DISABLE, INCLUDE and EXCLUDE functions, to be described hereinafter. The outputs of these filter control registers are applied, respectively, to compare circuits 374, 375, 376 and 377. The other inputs to compare circuits 374 through 377 are provided on leads 378 from the matcher section of FIG. 13 and comprise the G, L, E and B signals of FIG. 16. The outputs of compare circuits 374 through 377 are applied to a gating circuit 379 which, when enabled by a control signal on lead 380, provides an ENABLE control signal on output lead 381, a DISABLE control signal on output lead 382, an INCLUDE control signal on output lead 383 or an EXCLUDE control signal on output lead 384. These control signals on leads 381 through 384 are used to control the storage of software event data words in accordance with the store control logic to be described in connection with FIG. 19.

Figure 19:
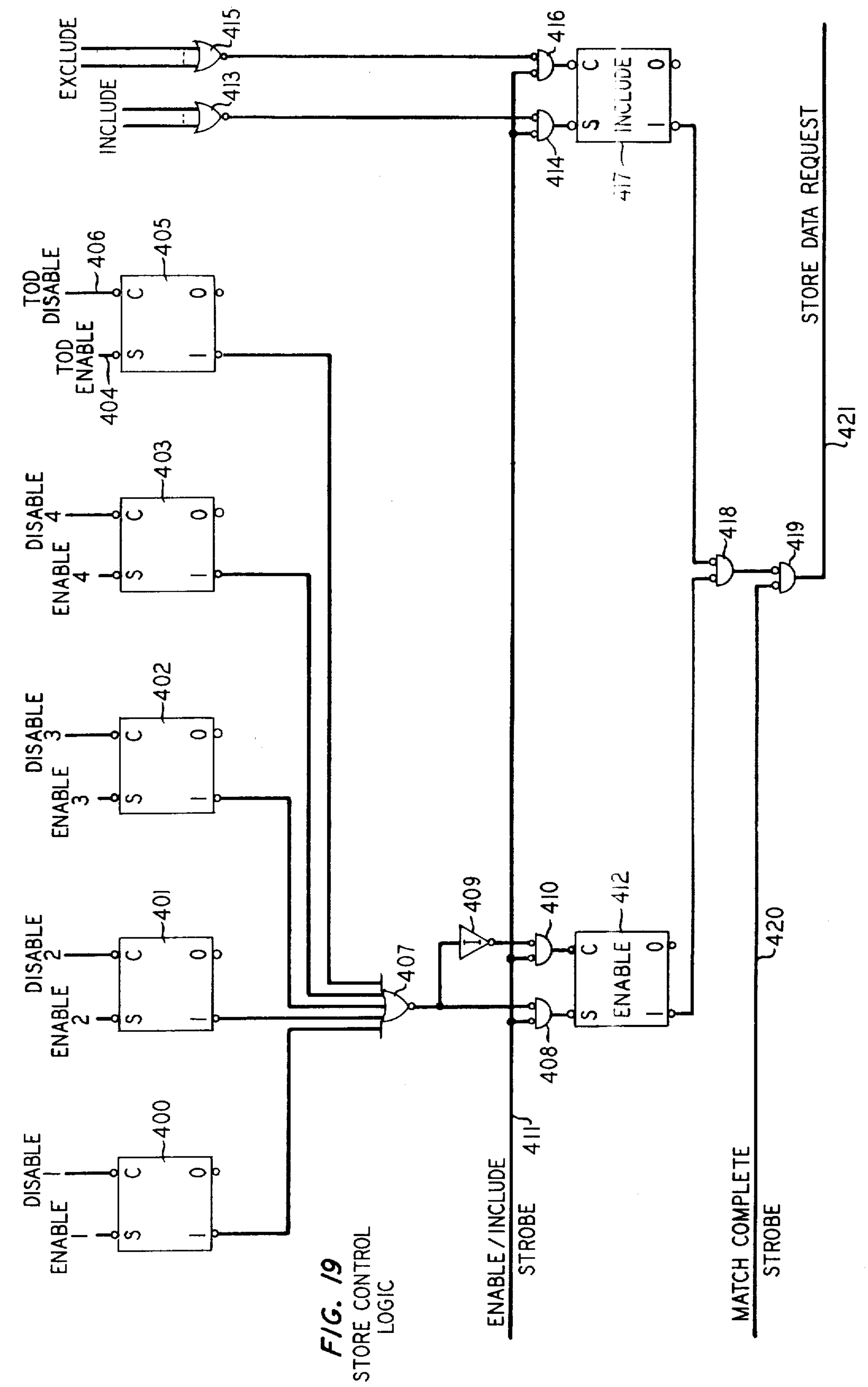
FIG. 19 is a detailed circuit diagram of the store control logic necessary to implement the computer monitor of FIG. 1.

In FIG. 19 there is shown a detailed circuit diagram of the store control logic 22 (FIG. 1) which is used to control which software events will be recorded in store 23. As described in connection with FIG. 18, four sets of ENABLE and DISABLE signals are generated by store control filters corresponding to FIG. 18. These four ENABLE signals are used to set, respectively, flip-flops 400, 401, 402 and 403. The corresponding DISABLE signals are used to clear the respective ones of flip-flops 400 through 403. A time-of-day ENABLE signal on lead 404 is used to set flip-flop 405 and a corresponding time-of-day DISABLE signal on lead 406 clears flip-flop 405. This permits data words to be stored in response to time-of-day compare signals rather than data values. Such time-of-day compare signals are generated as illustrated in FIG. 12 on time-of-day compare lead 193. It will be noted that flip-flop 405 can either be set or cleared by a time-of-day compare, but cannot be both set and reset by time-of-day compare signals since only a single compare circuit is provided in FIG. 12. The other control signal must be supplied by some other event, not shown.

The outputs of flip-flops 400, 401, 402, 403 and 405 are combined in NOR gate 407 the output of which is applied directly to NAND gate 408 and, after inversion in inverter 409, to NAND gate 410. When fully enabled by a signal on lead 411, the output of NOR gate 407 sets or resets flip-flop 412, depending on the ENABLE or DISABLE signals previously supplied from the store control filters.

The INCLUDE control signals from the store control filters corresponding to FIG. 18 are all applied to NOR gate 413, the output of which is applied to NAND gate 414. Similarly, all of the EXCLUDE control signals from the store control filters corresponding to FIG. 18 are collected in NOR gate 415, the output of which is applied to NAND gate 416. When fully enabled by a timing signal on lead 411, NAND gates 414 and 416 force flip-flop 417 to be set or cleared, depending on the INCLUDE or EXCLUDE conditions.

The outputs of flip-flop 412 and 417 are both applied to NAND gate 418 to indicate that a particular software event has both come after an ENABLE signal, before a DISABLE signal, represents a data signal to be included and does not represent a data signal to be excluded. All of these conditions are met when NAND gate 418 becomes fully enabled. The output to gate 418 is applied to NAND gate 419, which, when fully enabled by a timing signal on lead 420, provides a signal on lead 421 to the store input circuits of FIG. 24 to initiate the storage of that data entry.

Figure 20:
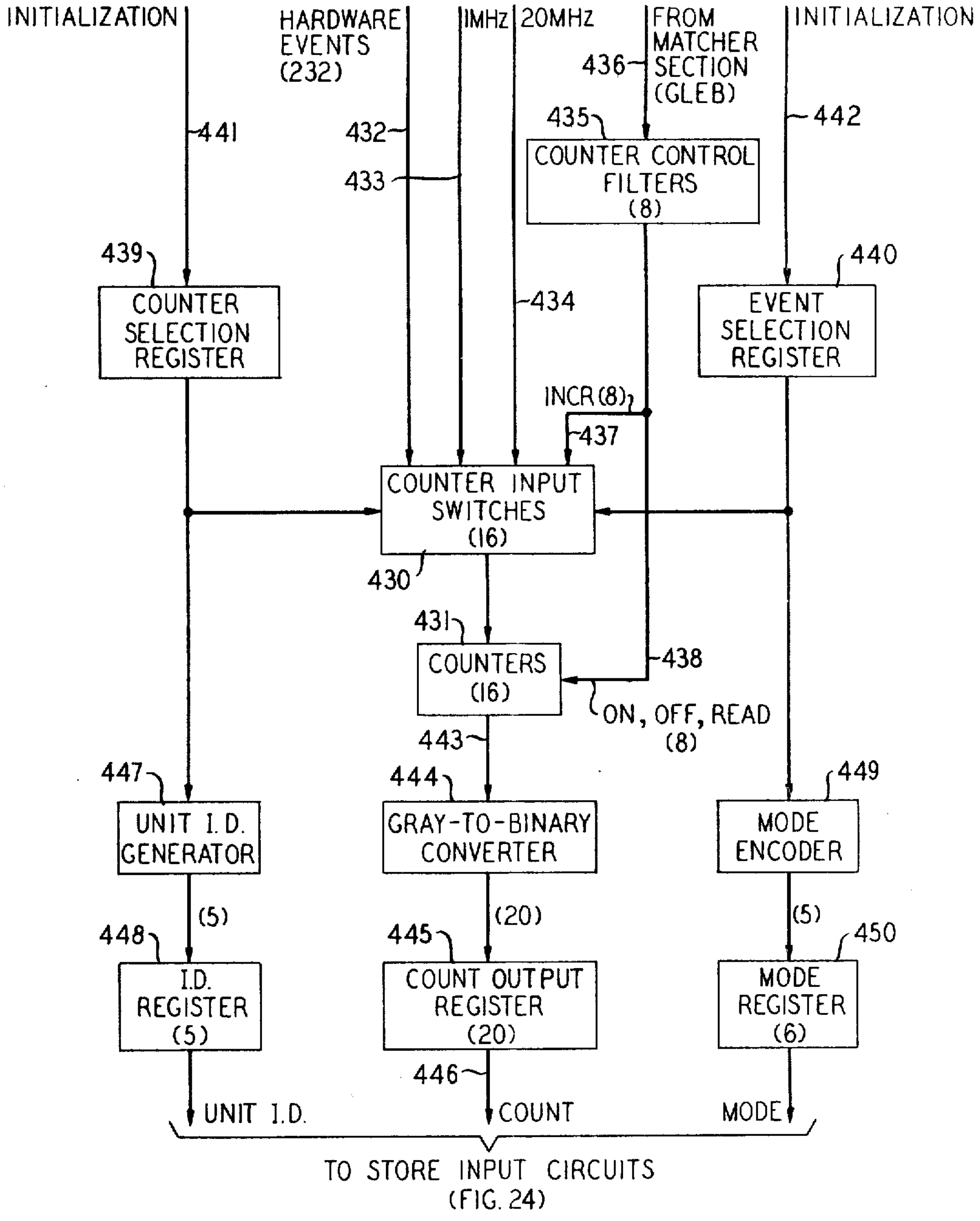
FIG. 20 is a general block diagram of the counter section necessary to realize the computer monitor of FIG. 1.

In FIG. 20 there is shown a detailed block diagram of the counter section 20 shown in FIG. 1. The counter section of FIG. 20 comprises a plurality of counter input switches 430 used to selectively connect hardware event signals to selected ones of 16 counters 431. These hardware events appear on a plurality of input lines 432 corresponding to leads 11 in FIG. 1. Also applied to input switches 430 is a one megahertz timing signal on lead 433 and a 20 megahertz timing signal on input lead 434. These timing signals will be used in the manner to be hereinafter described.

A bank 435 of counter control filters corresponding to FIG. 17 is provided. As noted in connection with FIG. 17, these filters are driven by G, L, E and B signals from the matcher section of FIG. 13 and produce eight sets of control signals termed ON, OFF, INCREMENT and READ signals. The eight INCREMENT signals are applied by way of leads 437 to input switches 430, while the ON, OFF and READ signals are applied by way of leads 438 to counters 431.

Counter input switches 430 are under the control of two selection registers 439 and 440. Counter selection register 439, initialized by signals on leads 441, selects the particular counter which is to be used for each counting operation. Event selection register 440, on the other hand, is initialized by signals on leads 442 and selects the particular event which is to be counted in the selected counter. This selection process and the details of the input switch 430 will be hereinafter described in connection with FIG. 21.

Counters 431 count in the gray code to minimize count ambiguities during transition periods. The outputs of counters 431 on leads 443 are applied to a gray-to-binary converter 444, the output of which is connected to count output register 445.

It will be noted that counters 431, converter 444 and register 445 each have a capacity of 20 bits to correspond to the 20 bit count field 45 of the counter word format shown in FIG. 2E. The count registered in register 445 is supplied by way of leads 446 to the store input circuits of FIG. 4 for storage in store 23 (FIG. 1), as will be described hereinafter.

The output of counter selection register 439 is also applied to a unit identification generator 447 which utilizes this counter selection signal to generate a binary coded identification of the selected counter. This five bit binary code is placed in counter identification register 448 and is used to supply the unit identification field 43 of the counter word of FIG. 2E. Similarly, the output of event selection register 440 is applied to a mode encoder 449 which encodes the selected event in a six bit identification code which is then stored in mode register 450. The contents of mode register 450 supply the six bits of mode field 44 in FIG. 2E.

Figure 21:
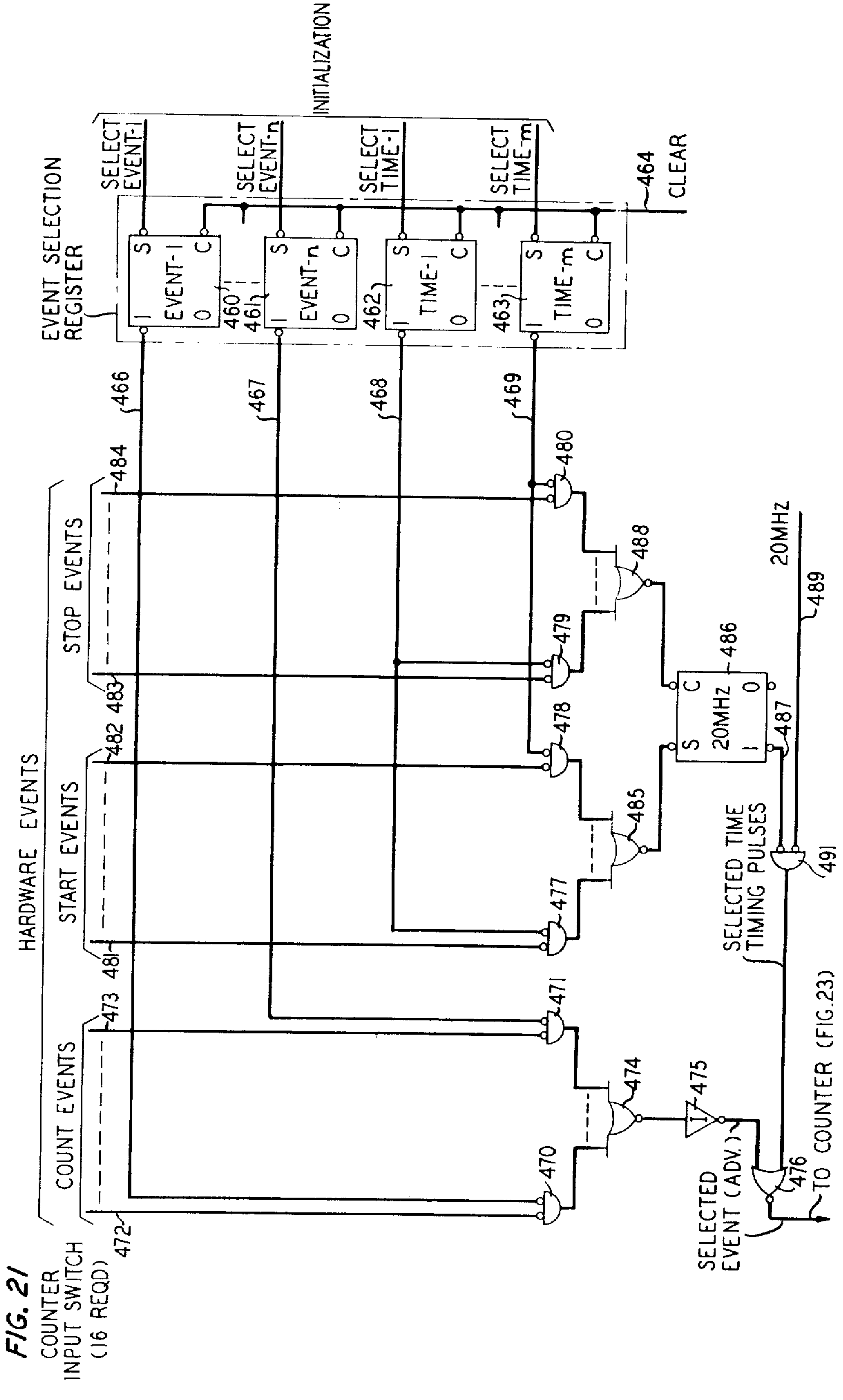
FIG. 21 is a detailed circuit diagram of one of 16 counter input switches required to realize the counter section of FIG. 20.

The details of one of input switches 430 is shown in FIG. 21. Thus, an event selection register comprising flip-flops 460 to 461 and 462 to 463 is shown. Each of flip-flops 460 through 463 is set by an initialization signal on a corresponding input lead and is cleared by a common reset signal on lead 464. When it is desired to select a particular event for counting, a select event signal appears on one of leads 466 through 467 to enable the corresponding one of NAND gates 470 through 471. NAND gates 470 through 471, in turn, gate event signals on one of leads 472 through 473 to NOR gate 474. The output of NOR gate 474, after inversion in inverter circuit 475, is applied to NOR gate 476. The input switch of FIG. 21 is thus used to select one of $n$ events to be counted in the associated counter.

In addition to simply counting hardware events, the computer monitor of the present invention is also able to measure the intervals between any two events. This is accomplished by initiating the counting of timing pulses at the starting event and terminating this counting process at the terminating event. To this end, flip-flops 462 through 463 select particular time intervals to be timed. A signal on lead 468 from flip-flop 462 enables "start" NAND gate 477 and "stop" NAND gate 479. Similarly, a signal on lead 469 from flip-flop 463 enables start NAND gate 478 and stop NAND gate 480. Start events on leads 481 through 482 are applied to respective ones of NAND gates 477 through 478, while corresponding stop events, appearing on input leads 483 through 484, are connected to respective ones of NAND gates 479 through 480.

The outputs of NAND gates 477 through 478 are combined in NOR gate 485 to set flip-flop 486 and provide an output signal on output lead 487. The outputs of NAND gates 479 through 480 are combined in NOR gate 488 to clear flip-flop 486 and remove the output from lead 487. The signal on lead 487 is used to gate a 20 -megahertz timing signal on lead 489 through NAND gate 491 to NOR gate 476. The output of NOR gate 476 is utilized to advance the corresponding counter, as will be described in connection with FIG. 23.

It should be first noted that many hardware events to be counted also require concurrent timing signals to render the accumulated counts meaningful. To this end, the counters are associated in pairs such that, while one counter of the pair is counting a particular hardware event, the other counter of the pair is counting a one-megahertz timing signal. This one-megahertz timing signal is merely one more event to be counted and appears on one of leads 472 through 473 of FIG. 21.

It should also be noted that software events can be counted with the arrangements of the present invention, as noted in connection with FIGS. 1 and 20. Each software event, by way of the matcher section 14 (FIG. 1) and the counter control filter 18 is capable of generating an INCREMENT signal (FIG. 17) which, as described in connection with FIG. 20, is applied to the input switches on lead 437. These INCREMENT signals also form one more of the count events on one of leads 472 through 473 in FIG. 21.

Hardware events which are desirably available for counting are summarized in Table I. These events have been selected with reference to the data processing system disclosed in the aforementioned J. S. Baynard et al. U.S. Pat. No. 3,623,011, granted Nov. 23, 1971.

TABLE I

| Mode No. | Description |
|---|---|
| 1. | INCREMENT |
| 2. | 1 MHZ |
| 3. | INSTRUCTION EXECUTED |
| 4. | JUMP EXECUTED |
| 5. | PCU FETCH REQUEST |
| 6. | Σ PCU FETCH REQUEST TO ACK TIME |
| 7. | φCU FETCH REQUEST |
| 8. | Σ φCU FETCH REQUEST TO ACK TIME |
| 9. | φCU STORE REQUEST |
| 10. | Σ φCU STORE REQUEST TO ACK TIME |
| 11. | SPARE (PULSE COUNTING) |
| 12. | SPARE (PULSE COUNTING) |
| 13. | SPARE (PULSE COUNTING) |
| 14. | PS MEMORY INITIATE |
| 15. | VS MEMORY INITIATE |
| 16. | IφC (PULSE COUNTING) |
| 17. | IφC (Σ TIME INCREMENTS) |
| 18. | IφC-1 COMMAND REQUESTS |
| 19. | IφC-1 Σ COMMAND REQUEST TO ACK TIME |
| 20. | IφC-2 COMMAND REQUESTS |
| 21. | IφC-2 Σ COMMAND REQUEST TO ACK TIME |
| 22. | SPARE (Σ TIME) |

In FIG. 22 there is shown in matrix form the assignment of various hardware events of Table I to the various counters of the monitor system. The left-hand column in FIG. 22 identifies the counters by the numbers 0 through 15. The top row includes a number at the head of each column identifying the different hardware events (modes) which can be selected by the input switch of FIG. 21 to operate the corresponding counters and correspond to the numbers in the left column of Table I. Since the computer system of the aforementioned Baynard et al. patent is a multiprocessing system, the various boxes of FIG. 22 contain references to identify the various modules of that system. Thus, the fifteen processor units of the Baynard system are identified by the designations PU-1 through PU-15. Similarly, the sixteen program store units of the Baynard system are identified by the designations PS-0 through PS-15 and the variable store units by the designations VS-0 through VS-15. The two input-output controllers (IOC-1 and IOC-2) of the Baynard system each include sixteen channels designated CHAN-0 through CHAN-15.

With these designations in mind, the various columns of FIG. 22 and corresponding entries in Table I can be explained, assuming each column corresponds to one initialization signal in FIG. 21 and thus one of registers 460 through 463. The numbered paragraphs correspond to the numbers at the heads of the columns in FIG. 22 and to the mode numbers in Table I.

1. The eight software events from the eight counter control filters illustrated in FIG. 17 are used to increment the various counters as shown in column 1. It can be seen that each software event can be used to increment either one or two counters, the other one of which is used to count timing signals.
2. All of the counters can be incremented by a one-megahertz timing signal as shown in column 2.
3. The execution of each instruction can be counted as shown in column 3 where the various row entries correspond to instruction counts from the various identified processing units in column 3.
4. The jump instructions executed by these processing units can also be counted for each of the processing units identified in column 4.
5. A program control unit (PCU) fetch request for a new program instruction for each of the various processing units can also be counted, as shown in column 5.
6. It is also possible, as shown in column 6, to time the interval between the program control unit (PCU) fetch request and the corresponding acknowledgment of that request, indicating that the request is being serviced. This period is timed by initiating the counting of 20-megahertz timing pulses at the time of the request and terminating this count at the time of the acknowledgment. This is accomplished as described in connection with FIG. 21 by setting and clearing flip-flop 486 for the selected counter. Column 6 indicates the assignment of the processing units (PU's) to the various counters for PCU fetch request to acknowledge timing.
7. Column 7 indicates the assignment of the operand control unit (OCU) fetch request counts for the various processing units (PU's).
8. In column 8 there is shown the manner in which the period between the operand control unit (OCU) fetch request and the corresponding acknowledge time is measured by the various counters, using the 20-megahertz timing pulses.
9. The operand control unit (OCU) also issues store requests to store operands and these store requests can be counted, as shown in column 9 of FIG. 22, for the various processing units (PU's).
10. The interval between the operand control unit (OCU) store request and the corresponding acknowledge timing can likewise be determined by counting 20-megahertz timing signals for the various processing units (PU's), as shown in column 10.
11. – 13. These event selection columns are not used and can be considered as spares.
14. Each program store (PS) initiates a memory access cycle each time it is desired to store or fetch a program instruction. These memory initiate signals are counted for each of the program stores (PS's) as shown in column 14.
15. Similar memory initiate signals for each of the 16 variable stores (VS's) are counted, as shown in column 15, in the indicated counters.
16. As noted in the aforementioned Baynard patent, each input/output controller includes a master control unit (MCU) for controlling input-output operations. Each time this master control unit (MCU) requests service from the output control unit (OCU), that event is counted as shown in column 16. Column 16 also shows the assignment of counters for store (S), fetch (F) and START events for the input control unit (ICU), output control (OCU), and Variable Stores (VS's) for either one of the two input-output controllers IOC-1 and IOC-2. These various events are all counted, as shown in column 16, in the indicated counters.
17. Corresponding intervals between IOC, —OCU, —ICU and —MCU request and acknowledge events are timed for both IOC's with 20-megahertz timing signals, as shown in column 17.
18. The IOC channel command requests are counted for the various channels of IOC-1, as shown in column 18.
19. The interval between the IOC-1 channel command request and the corresponding acknowledge time is measured, as shown in column 19, for the various channels.
20. Command requests for the second input-output controller (IOC-2) are similarly counted, as shown in column 20.
21. The interval between IOC-2 command requests and the corresponding acknowledgments are timed, as shown in column 21, using the 20-megahertz timing signals.
22. The selection mode represented by column 22 is a spare which can be assigned as desired to any other hardware event.

In each of the cases described above, the assigned counter (first column) accumulates the number of pulses that have occurred and hence records the number of events. The one-megahertz clock signal is treated merely as one more event.

When being used to time intervals, the 20-megahertz clock signal is enabled at the start of the interval and disabled at the end of the interval. The assigned counter can accumulate the time between a single pair of request and acknowledge pulses, or may accumulate the time between many such pairs to determine average times, provided the events are also counted.

Figure 23:
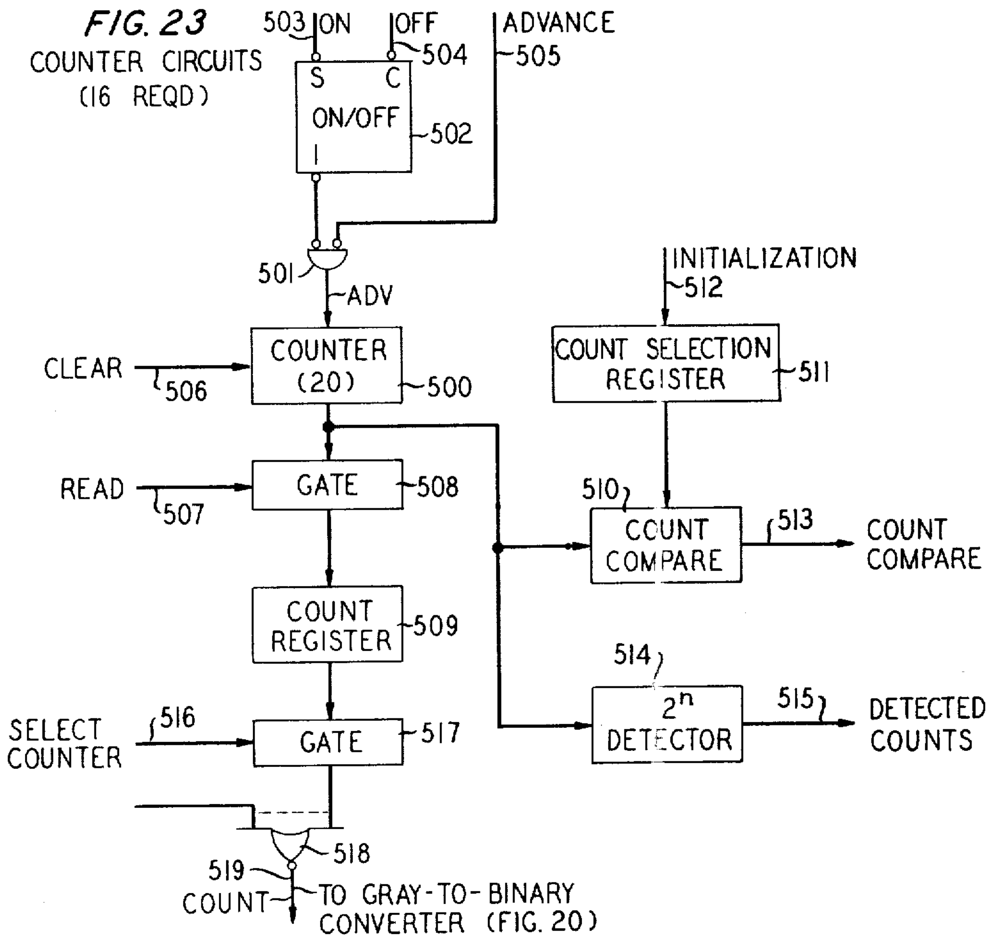
FIG. 23, found on the same sheet as FIG. 8, is a detailed block diagram of one of 16 counter circuits required for the realization of the counter section of FIG. 20.

In FIG. 23 (located on the same sheet of drawings as FIG. 8) there is shown one of the counter circuits corresponding to counters 431 in FIG. 20. The counter circuit of FIG. 23 includes a 20 place counter 500 which is advanced by the output from NAND gate 501. One input to NAND gate 501 is taken from flip-flop 502 which is, in turn, set by an ON control signal on lead 503 corresponding to the ON output on lead 361 from FIG. 17. Flip-flop 502 is cleared by an OFF control signal on lead 504 corresponding to the OFF signal on lead 362 in FIG. 17. The other input to NAND gate 501 is taken from advance lead 505 which corresponds to the output of NOR gate 476 in FIG. 21 and thus represents the event to be counted.

Counter 500 thus counts event represented by pulses on lead 505, provided, however, that flip-flop 502 has been set by a signal on lead 503 indicating that the counter has been turned ON and provided that flip-flop 502 has not yet been reset by a signal on lead 504 to indicate that counter 500 has been turned OFF. Counter 500 can be cleared by a control signal on lead 506. Count register 509 is normally connected to counter 500 during a counting operation. When it is desired to READ counter 500, a control signal appears on lead 507, corresponding to the READ control signal on lead 364 of FIG. 17. This control signal disables gate 508 to disconnect count register 509 from counter 500 and fixing the count at that value.

The count in counter 500 is also applied to a count compare circuit 510 to which there is also supplied a preselected count in count selection resiter 511. This preselected count is supplied to register 511 by initializing signals on lead 512. When the output of counter 500 matches the count stored in register 511, count compare circuit 510 produces an output signal on lead 513 to indicate this match.

The output of counter 500 is also applied to "$2^n$" detector 514. Detector 514 detects when the count from counter 500 has reached regular values corresponding to the various powers of "2" and produces output control signals on leads 515 when these counts are reached. These control signals can be used to terminate operations when counts have attained preselected values. Such detection obviously requires no more than the detection of the specific counts by appropriately wired NAND gate.

Under the control of a control signal on lead 516, a gate circuit 517 transfers the count from count register 509 to a combining NOR gate 518 to which there are also applied corresponding count signals from the other count registers in the 15 other counter circuits corresponding to FIG. 23. Thus, the selected count appears on output leads 519 and, as shown in FIG. 20, this count is applied to a gray-to-binary converter 444.

Only one counter circuit has been illustrated in FIG. 23. Fifteen more such counter circuits are required to implement the counter section of FIG. 20. As noted in connection with FIG. 22, the events to be counted are apportioned to the various counter circuits in accordance with the switching matrix represented schematically in FIG. 22.

In FIG. 24 there is shown a detailed block diagram of the store input circuits 21 of FIG. 1. The store input circuits comprise a plurality of registers 550 through 555 for storing entries to be made in store circuits 23 (FIG. 1) in the format described in connection with FIGS. 2B through 2E.

Registers 550 and 551 each comprise a 32 bit storage register for storing Word A and Word B (FIG. 2B), respectively, of a data entry. Similarly, count register 552 serves to store a counter word in the format shown in FIG. 2E and registers 553 and 554 serve to store Word A and Word B of a time-of-day entry corresponding to FIG. 2C. Register 555 serves to store a status word corresponding to Word A of FIG. 2D. It will be noted that the status entry also includes Word B, comprising 32 bits of time-of-day information. Status Word B is identical to time-of-day Word B (the second word of the time-of-day entry) shown in FIG. 2C and hence is present in register 554 and does not require a separate status register.

Access to the store input registers 550 through 555 is obtained by means of input gates 556 through 561, respectively. Gates 556 and 557 operate to gate data entries from the data convergence circuits of FIG. 11 into data registers 550 and 551, respectively. Gate 558 serves to gate a count entry from the counter circuits of FIG. 23 to count register 552. Gates 559 and 560 serve to gate time-of-day signals from the time-of-day generator of FIG. 12 into time-of-day registers 553 and 554. Gate 561 serves to gate status signals gathered individually from various parts of the monitor circuits themselves into status registers 555.

The status signals are also applied to a compare circuit 563. Also applied to compare circuit 563 is the contents of error selection register 564. Selection register 564 is initialized by signals on leads 565.

It can be seen that one or more selected status signals can cause a compare signal to occur on lead 575 from compare circuit 563, indicating a match with the error selection initialization in register 564. It is therefore possible to initiate a request for storing a status entry each time a status condition changes. Status entries can also be initiated whenever the status conditions match a preselected set of conditions registered in selection register 564.

The control signals 570 to operate gates 556 through 561 are derived from priority circuit 571, much like the priority circuit of FIG. 9. Thus, requests for storage of data, count, time-of-day and status entries in store 23 (FIG. 1) are received on request leads 572 through 575, respectively. Priority circuit 571 selects the request with the highest priority (e.g., time-of-day) and generates the necessary gating signals on leads 570 to store the selected entry in the appropriate ones of registers 550 through 555. Priority circuit 571 also generates a sequence of timing signals on output leads 576 which operate output gates 578 through 583 by way of control leads 587 and provides control commands by way of leads 584 to the store unit. The priority circuits 571 are arranged to prevent domination by high priority requests by requiring the servicing of lower priority requests before repeating service for higher priority requests.

The outputs of gates 578 through 583 are all supplied to NOR gate 585 where they are combined and applied to gating circuit 586. Gate 586 is under the control of a timing signal from leads 576 from priority circuit 571 and is used to transfer the selected store entry to the store circuits of FIG. 26.

Figure 25:
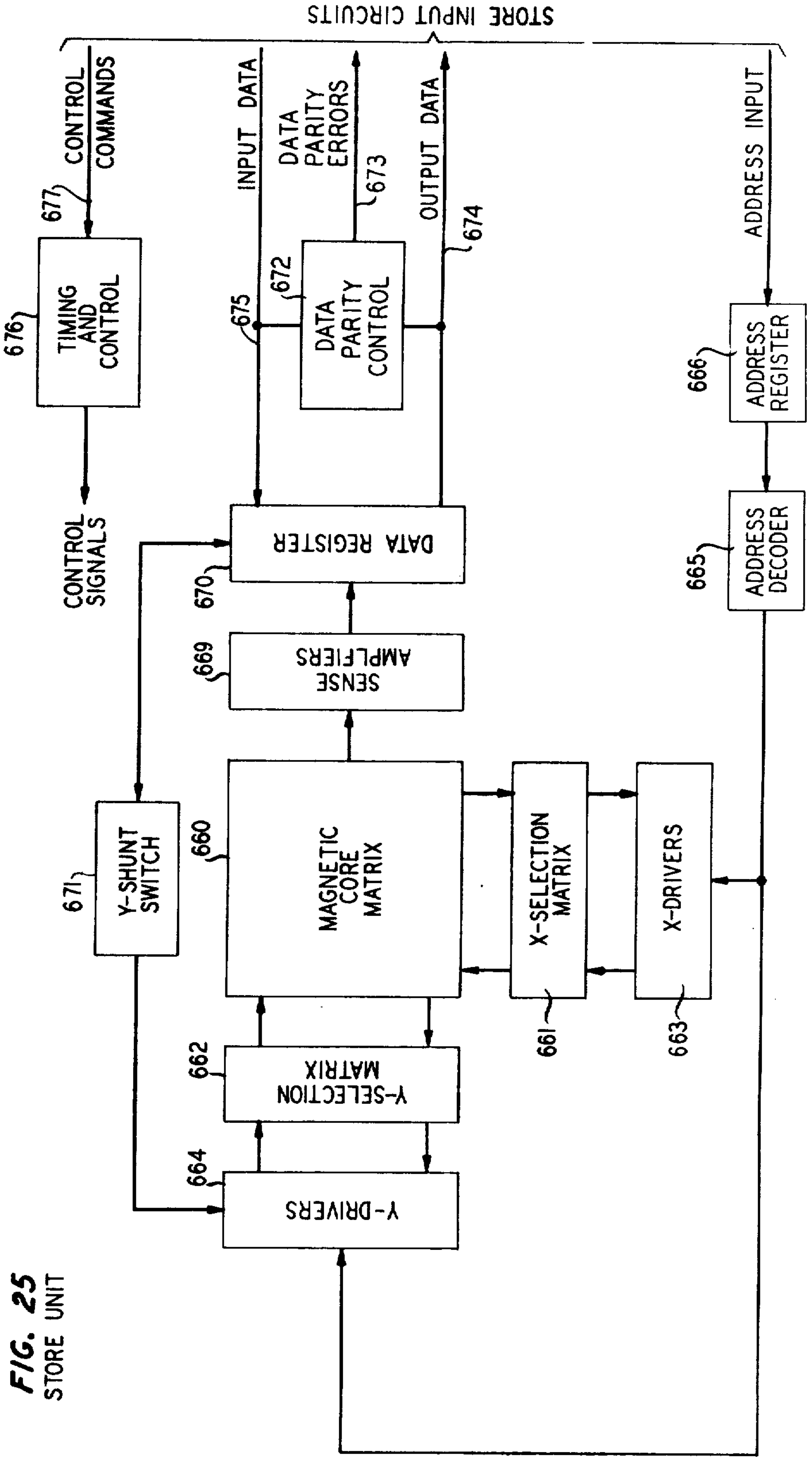
FIG. 25 is a detailed block diagram of a store unit useful in realizing the computer monitor of FIG. 1.

In FIG. 25 there is shown a detailed block diagram of a store unit suitable for use as store 23 in FIG. 1. In FIG. 25 there is shown a store unit comprising a magnetic core matrix 660 including an array of magnetic cores and associated control conductors threading those cores, all in accordance with practices well known in the art. The magnetic cores of matrix 660 are addressed in accordance with conventional 2-1/2D practice by coincident signals from X-selection matrix 661 and Y-selection matrix 662.

During the read cycle, a half-select current is driven on the selected line of X-matrix 661 and a half-select current is also driven on those ones of the lines of Y-matrix 662 in each bit position, forcing the selected magnetic cores 660 to the 0 state. During the write cycle, a half-select current is driven on the selected line of X-matrix 661 and a conditional additive half-select current is applied to the selected lines of Y-matrix 662 in each bit position to force the core to the 1 state. The conditional additive current is applied selectively to the Y-matrix 662 lines in each bit position by way of the Y-shunt switch 671. Since data is inserted in each bit position of a selected word by means of logically or conditionally selecting an additive half-select current, an independent Y-matrix 662 must be used for each bit position of the memory.

These selection matrices 661 and 662 are, in turn, driven by X-drivers 663 and Y-drivers 664, respectively. The drivers 663 and 664 receive address information from address decoder 665 which, in turn, receives the memory address from address register 666. These addresses are supplied to the store unit of FIG. 25 from the store address logic circuits of FIG. 26, to be described hereinafter.

Magnetic core matrix 660, when addressed from matrices 661 and 662, produces outputs representative of the binary information stored in the addressed location. These signals are detected by sense amplifiers 669 and the binary information is stored in data register 670.

All data stored in magnetic core matrix 660 includes parity control bits which may be used to verify the parity of the stored data. Each data word stored in register 670 is therefore checked for correct parity by data parity control circuits 672 and data parity errors are reported by way of line 673 to status register 555 in FIG. 24. The data itself is delivered by way of line 674 to the tape controller circuits 24 for storage in the tape units 25 (FIG. 1).

When it is desired to store information in the store unit of FIG. 25, this input data is delivered by way of lines 675 from gate 586 of FIG. 24 and stored in data register 670. At the same time, address signals are delivered to address register 666 indicating the precise location in which the input data is to be stored. The information previously stored at the addressed location in the magnetic cores 660 is first read from the magnetic cores 660, resulting in the destruction of that information. The resulting signals therefore need not be detected by the sense amplifiers 669 for this case. The input data stored in data register 670 is then delivered by way of the Y-shunt switch 671 to the magnetic core matrix 660 in synchronism with the address control signals generated by address decoder 665, drivers 663 and 664 and selection matrices 661 and 662. In this way, input information is stored in matrix 660 for further utilization. The input data is also checked for parity errors by parity control circuit 672 and parity errors reported on line 673 to status register 555 in FIG. 24.

The operation of all of the circuits of FIG. 25 are under the control of signals generated by timing and control circuit 676. Control circuit 676 is, in turn, directed by control commands on line 677 in such a manner as to generate the appropriate control signals at the proper times and in the appropriate sequence. These control commands operate in circuits 676 to generate the detailed timing and control signals which act to effectuate the desired actions.

Figure 26:
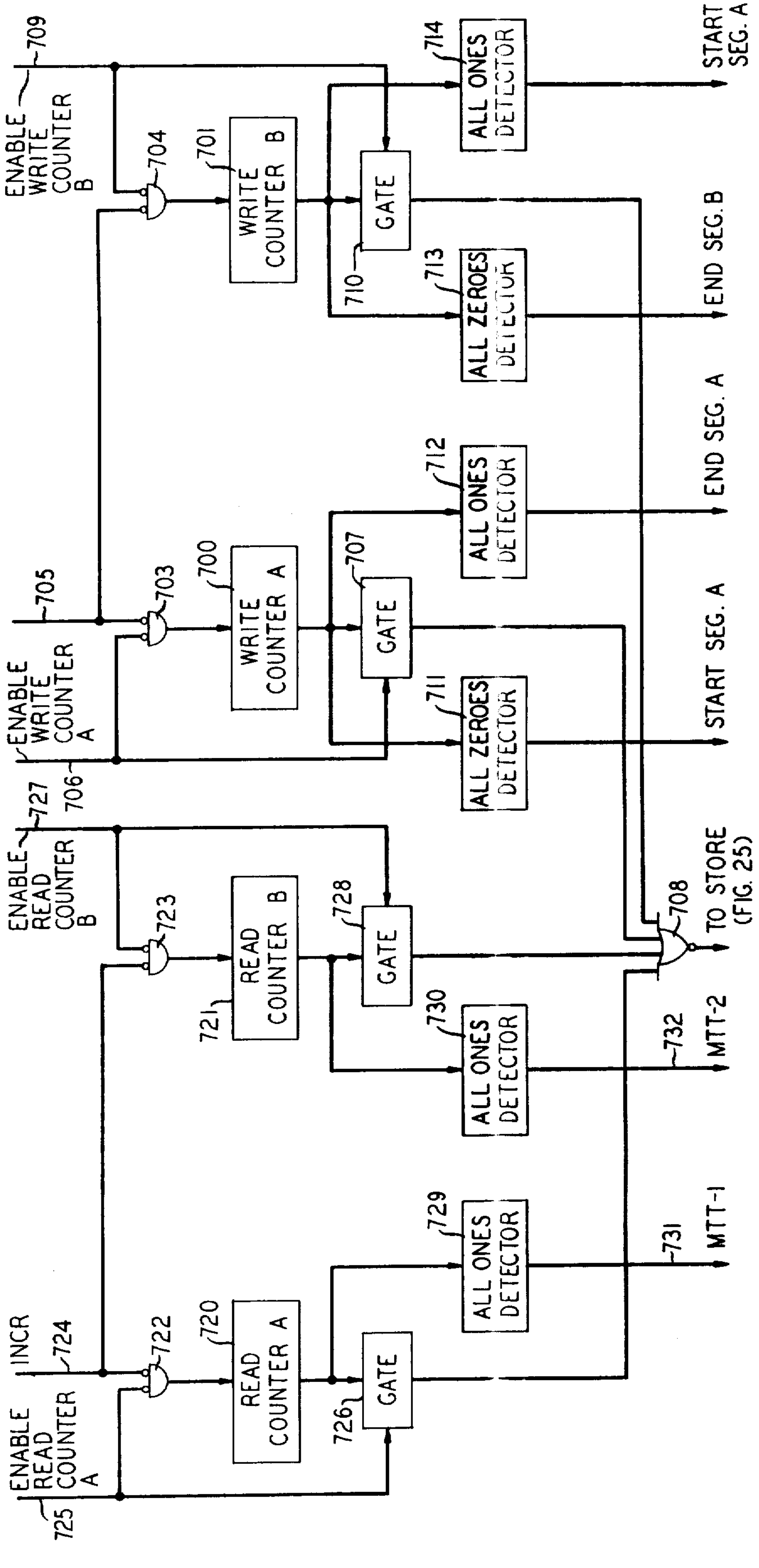
FIG. 26 is a detailed block diagram of the store address logic circuits necessary to realize the store control circuits shown in FIG. 1.

In FIG. 26 there is shown a detailed block diagram of the store address logic shown as element 29 in FIG. 1 and suitable for controlling the access to store 23. The store address logic of FIG. 26 includes two write counters 700 and 701 designated write counter A and write counter B, respectively. Write counter A is used for all normal addressing of the memory in the write mode. It is used to control writing in both the normal or lineal writing mode and in the circular writing mode in which overwriting occurs once the memory is filled. If the memory is being used in a split mode where one-half is being used for lineal writing and the other half for circular writing, then write counter A generates the addresses for the normal half of the memory and write counter 701 generates the addresses for the circular half.

Write counter 700 is advanced by pulses from NAND gate 703 while counter 701 is advanced by pulses from NAND gate 704. One input to each of NAND gates 703 and 704 is supplied from an increment line 705 which is pulsed each time a writing operation is completed and the next address must be generated. Writer counter 700 is fully enabled by a signal on lead 706 which forms the other input to NAND gate 703 and operates gate 707 to apply the new address, by way of NOR gate 708, to the store circuits of FIG. 25. Similarly, an enable signal on lead 709 completes the enablement of NAND gate 704 and operates gate 710 to apply addresses from write counter 701 through NOR gate 708 to the store of FIG. 25.

The tape units 25 of FIG. 1 are designed to accept data in blocks of 512 words, called segments. To control the blocking of data written into the memory of FIG. 25, detectors 711 and 712 are connected to counter 700 while detectors 713 and 714 are connected to counter 701. Only the nine least significant bits of the counter outputs are applied to these detectors. Thus when all 0's detectors 711 and 713 produce an output, it indicates that a new segment has been started. Similarly, outputs from all 1's detectors 712 and 714 indicate that a segment has been filled. These segment control signals are used to properly block the information for storage on the tape units 25 of FIG. 1.

The store address logic of FIG. 26 also includes a read counter 720 and read counter 721. Counters 720 and 721 are used to generate addresses for reading data from the store units of FIG. 25 and operate similarly to the write counters 700 and 701. Read counter 720, however, is utilized to generate reading addresses for all normal reading operations for a first tape unit MTT-1. Counter 721 is used for generating addresses to fetch data for a second tape unit MTT-2.

Counter 720 is advanced by signals from NAND gate 722 while counter 721 is similarly advanced by signals from gate 723. Increment pulses on lead 724 are applied to one input of each of gates 722 and 723. An enable signal on lead 725 is applied to NANd gate 722 and also enables gate 726 to apply addresses from counter 720 through NOR gate 708 to the store unit of FIG. 25. Similarly an enable signal on lead 727 completes the enablement of NAND gate 723 and enables gate 728 to permit the passage of address signals from counter 721 through NOR gate 708 to the store unit of FIG. 25.

An all 1's detector 729 is connected to the nine least significant digit leads from counter 720 to provide a segment terminating signal on lead 731 for the first tape unit. Similarly an all 1's detector 730 is connected to the nine least significant bit leads from counter 721 to provide a segment termination signal on lead 732 for the second tape unit. As previously noted, counter 720 is used to control the transfer of segments to a first tape unit while counter 721 is used to control the transfer of segments to a second tape unit. These tape units can be used simultaneously or consecutively, depending on the recording speed required.

A computer monitoring system has been described which will provide detailed monitoring of hardware and software events. This monitor has been described with respect to the specific computer system of J. S. Baynard et al. U.S. Pat. No. 3,623,011 only for purposes of illustration. This same monitor can be used for other types of general purpose computers and, indeed, the monitor itself can be constructed in many other ways which are recognized as full functional equivalents of the described embodiments. Such other arrangements may readily be devised by those skilled in the art without departing from the spirit and scope of this invention.

What is claimed is:

1. A computer monitor system comprising
- a software event selection circuit responsive to programmed event signals and preselected constant signals for selecting one of a plurality of received software event signals,
- a hardware event counting circuit responsive to hardware event signals for counting selected ones of said hardware event signals, and
- a counter control circuit responsive to said software event selection circuit for enabling, disabling, incrementing, or storing the output of said hardware event counting circuit,
- said software event selection circuit including
- a plurality of matching circuits for matching source identification signals, event identification signals and event value signals with respective preselected constant signals for each said programmed event signal.

2. The computer monitor system according to claim 1 wherein said hardware event counting circuit includes
- a plurality of counters,
- an input selection matrix,
- a plurality of constant signal registers,
- said matrix being responsive to counter selection constant signals in said registers and mode selection constant signals in said registers to connect selected event signals to selected counters in said counting circuit.

3. The computer monitor system according to claim 1 further including
- a data storage circuit, and
- means for storing in said storage circuit only selected software event signals and only selected hardware event count signals from said counting circuit.

4. The computer monitor according to claim 3 wherein said data storage circuit comprises
- a magnetic core memory, and
- a plurality of magnetic tape units, and
- means for accumulating said selected software and hardware event count signals in fixed-size blocks in said magnetic core memory before transfer to said tape units.

5. The computer monitor according to claim 4 further including
- means for cyclically storing the most recent of said selected event signals in excess of the capacity of a preselected portion of said magnetic core memory in place of the earliest stored event signals in said magnetic core memory.

6. A computer monitoring system for selecting only a portion of a plurality of software event data signals reflecting the operation of said computer, said monitoring system comprising
- a plurality of matching signal registers for storing preselected constant signals to be used for comparisons with portions of said data signals,
- an equal plurality of comparison circuits for comparing said constant signals to said portions of said data signals, and
- a storage register for storing only those of said data signals for which all of said comparison circuits indicate preselected relationships between said constant signals and all of the respective portions of each of said data signals.

7. A computer monitoring system comprising
- a software event selection circuit responsive to programmed event signals and preselected constant signals for selecting one of a plurality of received software event signals, said selection circuit including
- a source identification signal matching circuit for comparing a source identification signal with a first preselected constant signal,
- an event identification signal matching circuit for comparing an event identification signal with a second preselected constant signal, and
- an event value signal matching circuit for comparing an event value signal with a third preselected constant signal.

* * * * *